(12) United States Patent
Battlogg

(10) Patent No.: US 11,775,091 B2
(45) Date of Patent: Oct. 3, 2023

(54) COMPUTER MOUSE AND METHOD FOR OPERATING A COMPUTER MOUSE, REMOTE CONTROL, SMART DEVICE

(71) Applicant: INVENTUS Engineering GmbH, St. Anton i.M. (AT)

(72) Inventor: Stefan Battlogg, St. Anton i.M. (AT)

(73) Assignee: INVENTUS Engineering GmbH, St. Anton i.M. (AT)

( * ) Notice: Subject to any disclaimer, the term of this patent is extended or adjusted under 35 U.S.C. 154(b) by 0 days.

(21) Appl. No.: 17/799,794

(22) PCT Filed: Feb. 15, 2021

(86) PCT No.: PCT/EP2021/053688
§ 371 (c)(1),
(2) Date: Aug. 15, 2022

(87) PCT Pub. No.: WO2021/160896
PCT Pub. Date: Aug. 19, 2021

(65) Prior Publication Data
US 2023/0087434 A1     Mar. 23, 2023

(30) Foreign Application Priority Data

Feb. 14, 2020   (DE) .................... 10 2020 104 011.3
Feb. 21, 2020   (DE) .................... 10 2020 104 705.3
(Continued)

(51) Int. Cl.
*G06F 3/038*    (2013.01)
*G06F 3/01*     (2006.01)
(Continued)

(52) U.S. Cl.
CPC ............ *G06F 3/0383* (2013.01); *G06F 3/016* (2013.01); *G06F 3/0362* (2013.01); *G06F 3/03543* (2013.01)

(58) Field of Classification Search
CPC .... G06F 3/0362; G06F 3/03543; G06F 3/016; G06F 3/0383
(Continued)

(56) References Cited

U.S. PATENT DOCUMENTS 7,113,166 B1 *  9/2006  Rosenberg ............... G09B 9/00
                                                    345/157
7,680,574 B2    3/2010  Berg et al.
(Continued)

FOREIGN PATENT DOCUMENTS

CN    110618758 A    12/2019
DE    19722636 A1    12/1998
(Continued)

*Primary Examiner* — Koosha Sharifi-Tafreshi
(74) *Attorney, Agent, or Firm* — Laurence A. Greenberg; Werner H. Stemer; Ralph E. Locher

(57) ABSTRACT

A computer mouse for carrying out inputs into a computer unit that can be coupled to the mouse. The mouse has a mouse body that can be at least partially gripped and a mouse wheel that is rotatably supported on a carrying structure of the mouse body. The mouse wheel is able to be rotated by a finger to carry out an input. The mouse wheel has at least two actuation zones. A movement of the mouse wheel can be damped by a controllable brake device in a targeted manner in dependence on the actuation zone from which the mouse wheel is actuated and/or in dependence on which actuation zone has been previously activated.

20 Claims, 9 Drawing Sheets

(30) Foreign Application Priority Data

Jun. 26, 2020 (DE) .................... 10 2020 116 941.8
Jun. 29, 2020 (DE) .................... 10 2020 117 075.0

(51) Int. Cl.
*G06F 3/0354* (2013.01)
*G06F 3/0362* (2013.01)

(58) Field of Classification Search
USPC .................. 345/156, 163, 184, 684; 715/973
See application file for complete search history.

(56) References Cited

U.S. PATENT DOCUMENTS

| | | |
|---|---|---|
| 11,231,780 B2 | 1/2022 | Battlogg |
| 2001/0028361 A1 | 10/2001 | Culver |
| 2002/0158844 A1 | 10/2002 | McLoone et al. |
| 2006/0001657 A1 | 1/2006 | Monney et al. |
| 2010/0026631 A1 | 4/2010 | Pletikosa |
| 2010/0085306 A1 | 4/2010 | Wu |
| 2015/0253950 A1 | 9/2015 | Omaka et al. |
| 2020/0004352 A1 | 1/2020 | McLoughlin et al. |
| 2020/0005977 A1 | 1/2020 | Keltz et al. |

FOREIGN PATENT DOCUMENTS

| | | |
|---|---|---|
| DE | 102015203774 A1 | 9/2015 |
| KR | 2020090011786 U | 11/2009 |
| WO | 2018215350 A1 | 11/2018 |
| WO | 2019148505 A1 | 8/2019 |

\* cited by examiner

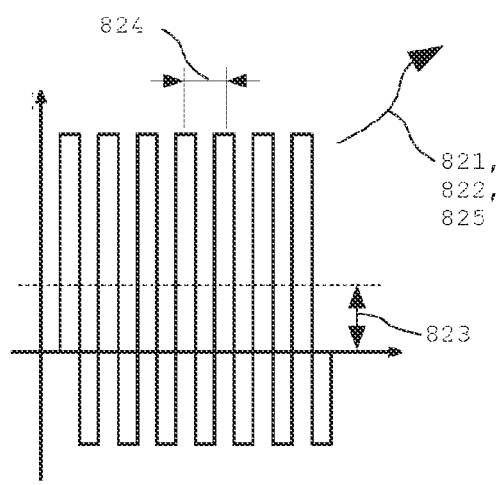 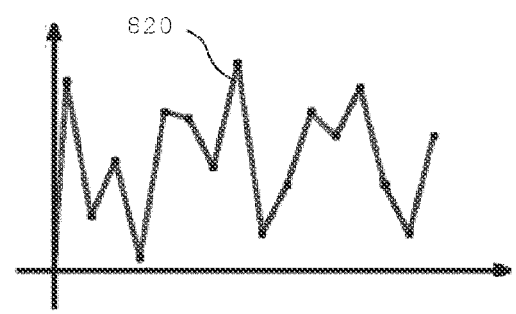
Fig. 8
Fig. 9
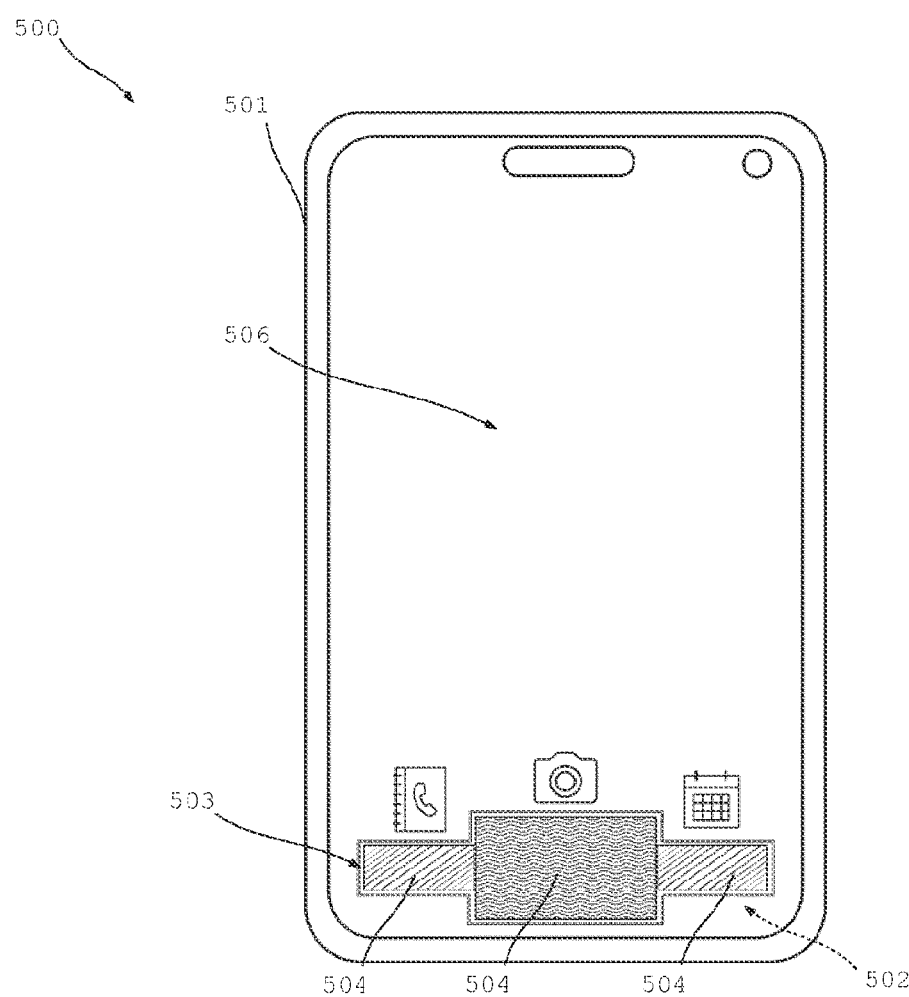
Fig. 10

COMPUTER MOUSE AND METHOD FOR OPERATING A COMPUTER MOUSE, REMOTE CONTROL, SMART DEVICE

FIELD AND BACKGROUND OF THE INVENTION

The present invention relates to a computer mouse for carrying out inputs into a computer device that can be coupled to the computer mouse. The computer mouse comprises at least one mouse body that can be at least partially gripped and at least one mouse wheel that is at least rotatably mounted on a support structure of the mouse body. The mouse wheel can be rotated by means of at least one finger to carry out an input.

SUMMARY OF THE INVENTION

Such computer mice have multiple uses. By contrast, it is the object of the present invention to improve the operability of the computer mouse. In particular, the ease of use and/or ergonomics are to be improved and the user is to be better supported in working with the computer mouse. Preferably, it should be possible to make the use of the computer mouse and the execution of inputs more intuitive. Furthermore, it is desirable that the computer mouse should be of a simple design and economical to manufacture.

This object is achieved by a computer mouse as claimed and by a method as claimed. Preferred developments of the invention are the subject of the dependent claims. Further advantages and features of the present invention will be apparent from the general description and the description of the exemplary embodiments.

The computer mouse according to the invention is used to carry out inputs into a computer device that can be coupled (or is coupled) to the computer mouse. The computer mouse comprises at least mouse body that can be at least partially gripped and at least one mouse wheel that is at least rotatably mounted on a support structure of the mouse body. The mouse wheel can be rotated by means of at least one finger (and thus also a thumb) to carry out an input. In this regard, the mouse wheel comprises at least two actuation zones. The mouse wheel can also comprise three or four or five or more actuation zones. A movement of the mouse wheel, in particular a rotation of the mouse wheel, can be damped in a targeted manner by means of at least one controllable (in particular magnetorheological) braking device depending on the actuation zone from which the mouse wheel is actuated and in particular rotated and/or depending on which actuation zone of the at least two actuation zones was previously activated (for example by pressing on the actuation zone). In particular, the movement of the mouse wheel can be damped in a targeted manner by the fact that a torque for the movement can be changed or adjusted in a targeted manner.

The computer mouse according to the invention offers many advantages. Particularly advantageous is the mouse wheel with its (in particular different) actuation zones, which can be damped in a targeted manner by the (magnetorheological) braking device. Depending on which zone is used (for example touched), the rotational movement is damped to a certain extent. It is also particularly advantageous that only one mouse wheel is required for this. Thus, diverse and at the same time intuitive operating possibilities can be implemented in a particularly compact manner and at the same time with a simple design. Through the invention the user can be supported in a targeted manner when working with the mouse. In addition, the use of the mouse is made considerably more comfortable and the execution of inputs more intuitive and faster. For example, haptic feedback can improve productivity and reduce the frequency of user errors. Another particular advantage is the silent operation, since no mechanical detent mechanisms or the like are required. In addition, if required, noises or even audio can be generated during rotation by controlling the braking device accordingly.

In all embodiments of the invention, it is preferred that the braking device is magnetorheological. In particular, the braking device comprises at least one magnetorheological medium and at least one field generation device for generating a magnetic field and, in particular, also for controlling a magnetic and/or electric field strength. In particular, by means of the field generation device, the medium can be influenced in order to adjust the resistance to movement (in particular the torque and/or moment) for the rotatability of the mouse wheel. A magnetorheological braking device can be used to generate particularly detailed haptic feedback.

Preferably, the actuation zones are connected to each other for conjoint rotation. In particular, the actuation zones have a common axis of rotation. In particular, the actuation zones can only be rotated together. In particular, all actuation zones of the mouse wheel are rotated when the mouse wheel is rotated. In particular, the actuation zones are not independently movable. The actuation zones can be fixedly connected to each other (in particular, not detachable non-destructively). In particular, the actuation zones are integrally connected to each other. In particular, the actuation zones are rotatably mounted on a common axis. In particular, the actuation zones are fixedly connected to each other. In particular, the actuation zones are arranged axially next to each other. In particular, the actuation zones are arranged one behind the other in the longitudinal direction of the mouse wheel or along the axis of rotation. In particular, the actuation zones correspond to axial portions of the mouse wheel. In particular, at least one common braking device is provided for the actuation zones. In particular, the actuation zones are damped by only one (in particular magnetorheological) braking device. In particular, the actuation zones are mounted on a common axis. This offers an implementation of the invention which is particularly simple in terms of design and can be manufactured economically at low cost.

In particular, the braking device and the mouse wheel (especially also the actuation zones) are rotatable about a common axis of rotation. Particularly preferably, the mouse wheel and the braking device are mounted on a common axis. The braking device can also be rotatable about an axis of rotation which is arranged parallel or transverse to the axis of rotation of the mouse wheel. In particular, the mouse wheel and the braking device are then mounted rotatably about one axis each.

The braking device can be coupled to the mouse wheel by means of at least one gear unit. The gear unit can be used for transmission or reduction or forwarding of a speed of the mouse wheel in relation to the braking device. For example, higher (braking) torque can be achieved by the gear unit. The gear unit can be used to connect the axes of rotation of the mouse wheel and the braking device, which axes are arranged in parallel and offset, or transversely. For example, the braking device can be arranged offset to the axis of rotation of the mouse wheel, for example to make better use of the installation space.

In particular, the actuation zones are axially arranged directly or indirectly next to each other. The axial arrangement refers in particular to an axis of rotation of the mouse wheel and/or the braking device. For example, the actuation zones are or comprise axial portions of the mouse wheel.

In all embodiments, it is particularly preferred that the damping (in particular the torque) is adjustable depending on at least one angle of rotation of the mouse wheel detected by means of at least one sensor device. In particular, the damping (in particular the torque) is adjusted in a targeted manner depending on the angle of rotation. In particular, the damping (in particular the torque) is dynamically adapted depending on the angle of rotation. The change in the damping or the torque of the rotating mouse wheel leads in particular directly to a change in the tangential force required to rotate the mouse wheel and thus to the force on the finger (finger force). This change in force on the finger is perceived by the user as force feedback.

In advantageous embodiments, it is preferred that the sensor device comprises at least one sensor (for example encoder, rotary encoder, Hall encoder, etc.). The sensor is for example an angle sensor and in particular a rotation angle sensor. An absolute position (for example absolute encoder) or a relative position can be detected. The sensor can detect the angle of the mouse wheel directly or also indirectly via a position of another component and in particular of the braking device. For example, an angular position and/or angle of rotation of the braking device or of the mouse wheel itself is detected for this purpose. The detected angle is preferably made available to the control device for the control of the braking device.

Preferably, the computer mouse comprises at least one monitoring device. Preferably, the monitoring device comprises at least one near-field detection system or is configured as such. Other types of monitoring are also possible. In particular, the monitoring device, preferably the near-field detection system, is suitable and configured for sensing from which actuation zone the actuation occurs. In particular, the monitoring device is suitable and configured for detecting by way of sensors in which actuation zone an actuation occurs. In particular, a rotational movement of the mouse wheel is assigned to that actuation zone which has been detected by the monitoring device and in particular by the near-field recognition system as the actuation zone from which the actuation takes place. The monitoring device comprises in particular at least one image recognition sensor and/or proximity sensor and/or near-field sensor and/or touch sensor and/or radar sensor and/or at least one camera device and/or at least one capacitive sensor. In particular, at least one sensor of the monitoring device is assigned to each of the actuation zones.

In a particularly advantageous and preferred embodiment, the monitoring device is suitable and configured for detecting and, in particular, also recognizing gestures. In particular, the monitoring device comprises at least one gesture recognition system. In particular, at least one gesture recognition zone extends around the mouse wheel for this purpose. In particular, the monitoring device is suitable and configured for recognizing at least one gesture executed in the region of the gesture recognition zone and to carry out at least one input or function depending on the gesture. In particular, the gesture recognition system comprises at least one radar sensor and/or at least one camera device and/or at least one other type of sensor for gesture recognition. It is possible that at least one actuation zone can be activated by means of at least one gesture.

It is also preferred and advantageous that the actuation zones can each be activated and in particular also deactivated by a touch and/or a press. For example, a rotational movement of the mouse wheel is assigned to that actuation zone which was previously touched and/or pressed at least once. It is possible that a detection, in particular a measurement, of a pressure intensity takes place for this purpose. In particular, the actuation zones can be activated depending on the pressure intensity. In particular, at least one pressure sensor is assigned to each of the actuation zones.

Preferably, the actuation zones are haptically and/or visually distinguishable (for example by different illumination). The actuation zones can also be made of glass, plexiglass, transparent or semi-transparent materials and/or can be illuminated from the inside or outside. In particular, a haptic differentiation is already possible without a rotational movement of the mouse wheel. In particular, the actuation zones each have a different surface (for example, shape: transverse grooves, longitudinal grooves; knurling, etc.; for example material: plastic, glass, metal, chrome-plated, gold-plated, etc.) and/or size and/or geometry (for example cambered, concave, convex, etc.) and/or color and/or illumination. For example, the surfaces differ in their coarseness or roughness and/or in their diameter and/or in their outer contour. It is possible that one actuation zone protrudes or is recessed relative to the other actuation zone. It is also possible that the actuation zones are at least partially enclosed in the mouse body with different circumferential angles and/or protrude or are exposed from the mouse body.

The computer mouse comprises in particular at least one control device. The control device is in particular suitable and configured for controlling the braking device at least depending on at least one control command and for converting the control command into at least one haptic signal (force feedback) that can be perceived at the mouse wheel. The haptic signal comprises in particular a defined sequence of deceleration torques or is designed as such a sequence. This is done in particular so that a user can receive or receives at least one haptic feedback (so-called force feedback) at the mouse wheel as the consequence of an input made and/or during an input. In particular, a deceleration torque is applied to the rotatability of the mouse wheel to provide a haptic feedback. The haptic signal comprises in particular a defined sequence of deceleration torques or is designed as such. In particular, a haptic signal is understood to be a substantial (and in particular perceptible) change in the rotational resistance.

Suitable haptic feedbacks can thus be assigned to specific inputs, whereby the user can infer purely from the feedback what he is setting or what function he is performing or adjusting. Thus, another particular advantage of the invention is that not only can inputs be made from the user to the computer device, but also haptic feedback can be provided from the computer device to the user via the mouse wheel. The computer mouse with the manually tactile mouse wheel allows very direct (preferably quasi-real-time) feedback that can be felt directly with the finger. This allows very precise control to be carried out. Direct contact with a finger of the hand, which can also be gloved, enables sensitive and intuitive control. For example, if the user bindingly confirms an order process with the mouse wheel, the user receives a different, clearly assignable, force feedback for this than for the previously made selection of order items. This can be a strongly increased torque, but also a torque ripple followed by a short high torque and then a turnover with a lower torque followed by a barrier (blocking or stop or very high torque) as the end of the order confirmation.

The individual feedback can be assigned by the software in the form of artificial intelligence.

In all embodiments it is possible for the computer mouse to comprise at least one display. In particular, the display serves to indicate a (current) function assignment of the actuation zones. This provides convenient support for haptic feedback.

The control command specifies in particular what deceleration torque is to be set at what angle of rotation and/or at what time. The control command can comprise at least one function that describes a torque profile over the angle of rotation and/or over time. The control command can contain information about how such a function is to be dynamically adjusted.

In particular, the control command is provided by the computer device and/or by the control device. The computer device and/or the control device can in particular generate a multitude of different control commands or can select a control command in a targeted manner from a plurality of stored control commands. The computer mouse can be coupled wirelessly and/or in a wired manner to the computer device.

In a particularly preferred and advantageous development, haptic feedback is provided depending on the actuation zone in which the mouse wheel is actuated and, in particular, touched. For example, when the mouse wheel is rotated at a first actuation zone, a higher frequency is set for the sequence of deceleration torques than for when the mouse wheel is rotated at the other actuation zone. This has the advantage that the user can recognize, without visual contact, which inputs he is currently making. In particular, such haptic feedback also occurs in depending on a control command from the computer device.

It is also preferred and advantageous that a specific input is made depending on the actuated and/or active actuation zone. Preferably, the assignment of actuation zone and input is programmable and/or dynamically adaptable. The assignment can also be made by a control command from the computer device. In particular, the control device of the computer mouse is suitable and configured for transmitting at least one separate input to the computer device for each actuation zone. For example, two or more individual mouse wheels or other control buttons can be simulated with only one mouse wheel. In particular, the control device is suitable and configured for providing the computer device with an input signal for each actuation zone.

It is possible that the actuation zones are each suitable and configured for operating at least one specific function of the computer device which can be coupled to the computer mouse, so that a different function of the computer device can be controlled depending on the actuation zone actuated. In accordance with the invention, a function is also understood to mean an operation of a program running on the computing unit or of a software stored on the computing unit and/or an operation via a network.

The rotational movement of the mouse wheel can preferably be subjected to an adjustable detent effect during scrolling. Preferably, the detent effect is generated by a targeted deceleration (in particular higher torque) and/or blocking (in particular high torque) and a targeted release of the rotational movement (in particular low torque) at specific time intervals and/or at specific angles of rotation. Preferably, the detent effect (ripple) is also set depending on the actuation zone from which the mouse wheel is actuated and, in particular, rotated. In particular, a different frequency for the sequence of deceleration torques is set depending on the particular actuation zone. Depending on the detent effect, in particular also a different conversion of the input takes place at the computer device, for example a faster or slower scrolling or the like. Scrolling is carried out in particular by means of a rotational movement of the input element.

In particular, the computer mouse comprises at least one mouse body with an arrangement of the mouse wheel, which arrangement is optimized for right-handed users. In particular, the computer mouse comprises at least one arrangement of the mouse body, which arrangement is optimized for left-handed users. For example, a mouse wheel that is intended to be operated with the thumb is arranged on the left or left-hand side in the arrangement optimized for right-handed users. For example, a mouse wheel which is intended to be operated with the thumb is arranged on the right or right-hand side in the arrangement optimized for left-handed users. In particular, the invention comprises a computer mouse having a mouse body with the arrangement optimized for right-handed users and a computer mouse having a mouse body with the arrangement optimized for left-handed users. It is also possible for the mouse wheel to be arranged on the mouse body selectively in the arrangement optimized for right-handed users and the arrangement optimized for left-handed users. Preferably, a tool-free repositioning of the mouse wheel on the mouse body is provided. Preferably, the computer mouse independently detects whether the user is right-handed or left-handed and switches the arrangement and the haptic behavior accordingly. Preferably, the detection can be performed via the monitoring device and in particular the near-field detection system. The user can thus also easily and conveniently switch from right-handed operation to left-handed operation, which is beneficial for the muscles, joints and tendons during prolonged use.

The mouse body can comprise at least a first contact portion for the index finger. The mouse body can comprise at least a second contact portion for the thumb. The mouse wheel can be arranged here in the first contact portion. It is also possible that the mouse wheel is arranged in the second contact portion. The computer mouse can also comprise at least two mouse wheels. Then, preferably, at least one mouse wheel is arranged in each of the first contact portion and the second contact portion. In this case, only one of the mouse wheels can be provided with at least two actuation zones. It is also possible that both the mouse wheel of the first contact portion and the mouse wheel of the second contact portion are equipped with at least two actuation zones each.

The first contact portion is arranged in particular in an upper and preferably front portion of the mouse body. The first contact portion is arranged in particular on an upper side of the mouse body. The mouse wheel arranged in the first contact portion is designed in particular as a finger roller for the index finger and/or a finger other than the thumb. The second contact portion is arranged in particular in a lateral portion of the mouse body. In particular, the second contact portion is arranged on such a side of the mouse body which connects an upper side and a lower side. The second contact portion is arranged, for example, on a left half of the mouse body (in an arrangement optimized for right-handed users) and/or on a right half of the mouse body (in an arrangement optimized for left-handed users). The mouse wheel arranged in the second contact portion is designed in particular as a thumb roller.

In all embodiments, it is particularly preferred that the rotatability of the mouse wheel can be adjusted by means of the braking device from freely rotatable (so-called freewheeling; free-spinning or low torque) to completely blocked for the manually generatable force occurring at the mouse wheel during operation (in particular high torque). Blocking is understood to mean in particular such a high deceleration torque that no movement of the mouse wheel is possible with the finger or hand forces to be expected as intended. In particular, the mouse wheel must first be actuated in another way to release the blocking (for example by pressing).

It is possible and preferred that the mouse wheel can be pressed to carry out an input. In particular, the mouse wheel can be designed to be pressed and/or pulled. In particular, the mouse wheel can be pressed and/or pulled transversely to the axis of rotation. It is also possible that the mouse wheel can be pressed and/or pulled along the axis of rotation. It is possible here that there is no damping by the (in particular magnetorheological) braking device for the pressing movement and/or pulling movement. However, it is also possible that the pressing movement and/or pulling movement can be damped in a targeted manner by means of the braking device and/or by means of at least one further (in particular magnetorheological) braking device. During the pressing movement, the rotational movement of the mouse wheel can be automatically set to be more sluggish or even blocked (high torque), which prevents unintentional scrolling during pressing. It is possible that in such an embodiment a detection, in particular a measurement, of a pressure intensity takes place. In particular, the input is then carried out depending on the pressure intensity. Depending on the pressure intensity, a different input can be made or a different function can be set.

In an advantageous development, the mouse wheel is designed as a rocker. In particular, the mouse wheel comprises at least one rocker bearing. In particular, the rocker bearing is arranged between at least two actuation zones. In particular, the mouse wheel can be tilted to both sides of the rocker bearing to carry out an input. In particular, depending on the pressed and/or pulled actuation zone, a specific input is made and/or a specific haptic feedback is provided. In this context, damping by means of the braking device may or may not be provided for the pressing and/or pulling. In particular, the rocker bearing has a pivot axis which is arranged transversely to the axis of rotation of the mouse wheel.

It is also possible that the monitoring device is suitable and configured for detecting at which of the actuation zones the mouse wheel is pressed and/or pulled. Then, in particular, an input is made and/or haptic feedback is provided depending on the actuation zone at which the mouse wheel is or was pressed and/or pulled.

The method according to the invention is used for operating a computer mouse as previously described. The method also achieves the previously stated object in a particularly advantageous manner. In particular, the mouse wheel is moved by at least one finger to carry out an input. In particular, a movement resistance for the movability of the mouse wheel is set depending on the actuation zone from which the mouse wheel is actuated and/or depending on which actuation zone was previously activated.

In particular, the computer mouse is suitable and configured for implementing the method steps described within the scope of the invention by means of the control device.

Preferably, an assignment of the actuation zones is displayed with a haptic and/or optical and/or acoustic signal, so that, by way of such a signal, it can be recognized which function can be operated with at least one specific actuation zone (in particular currently). Preferably, the signal is automatically displayed when an assignment is defined and/or changed. For example, when an incoming call is received, an actuation zone is automatically assigned to accept the call. This actuation zone is then illuminated in green, for example, or marked with a call symbol on a display associated with the actuation zone. The call can then be accepted in a vehicle without the driver having to search and without being distracted.

Preferably, an actuation zone that is currently intended for carrying out an input is indicated by an optical signal. In particular, the movement resistance for the movability of the mouse wheel is automatically adapted to the currently intended execution of the input.

In particular, the method provides for (simpler) operation of the computer mouse or for simplification of operation in that a specification (input request) not generated by the user/operator can be converted into an operator command in a simplified manner in that at least one of a plurality of actuation zones assigned to the specification lights up (optical recognition) and, after the user/operator has touched the actuation zone assigned to it, the haptic feedback when the input device (actuation zone) is actuated adapts to this process accordingly.

This can proceed as follows, for example: First, a control command or the like comes in from an input receiving device, for example, a telephone call. Then, an LED (or a symbol in a display) lights up at an actuation zone assigned to the telephone or call acceptance. This tells the user exactly where to reach. The user then turns the actuation zone and notices, based on haptic feedback, that he is accepting the call (increased force), for example, and can change the volume after turning further, since the torque then increases. The distraction is thus minimal and the operator notices haptically whether he is doing something right or wrong.

In particular, the procedure described above, in particular the optical signal, is further supplemented by an acoustic and/or haptic signal.

In a likewise advantageous and preferred embodiment, the computer mouse can be used for gaming (computer games) and is designed as a gaming mouse.

For example, in computer games where virtual weapons are used, the actuation zones of the mouse wheel have different functions, for example. The right zone is used, for example, to select or change the weapon. The middle zone is used, for example, to set the zoom factor (for example in the case of a rifle with telescope) or to reload the weapon. When zooming, an end stop can be simulated, i.e. the damping is set to a maximum value. Or, the resistance is for example higher than for the other zones, in order to be able to zoom in with a finer degree of precision. With the left zone for example the weapon is operated. The resistance of the mouse wheel can be changed from weapon to weapon to replicate (simulate) the different trigger strengths of different weapons.

This technology can be used in simulators such as flight simulators, but also spaceship simulators, simulators for cars, agricultural and construction machinery. In cars and off-road vehicles, for example, the left actuation zone for example can be used to change the transmission gear, the middle actuation zone for example can be used to change the chassis (chassis damper), and the right actuation zone for example can be used to actuate the additional nitrous oxide injection (overboost). The haptic feedback can always be adapted here exactly to the process to be adjusted. For example, the shifting of the transmission is a "high/low torque with barrier (stop or very high torque)" and the continuous adjustment of the chassis is an "increasing or decreasing torque" with barrier at the end of the adjustment process.

In flight simulators, the three zones can be used for example for the various elevators, airbrakes, and landing flaps. Depending on the flight condition in the game (for example low airspeed, high airspeed, etc.), the adjustment torques (finger forces) can vary or adapt to it, for example. This gives the user a very realistic feedback. Advantageously, even more than three actuation zones could be used, simulating the instrument panel. For helicopters, for example, the different actuation zones can each adjust the angle of attack of the rotors, the flight direction, and the tail rotor.

In all embodiments, it is preferred that inputs can also be made by moving the mouse body over a contact surface. In particular, the movement is detected optically and/or in a mechanosensory manner.

In computer mice for gaming, or gaming mice, it is often desired that the resolution of the optical detection can be adjusted. A higher resolution (usually in DPI—dots per inch) means greater movement of the mouse pointer for the same movement of the computer mouse than with a lower resolution. With the invention presented herein, the adjustment of the resolution can be implemented in a particularly comfortable manner. In particular, by means of at least one of the at least two actuation zones, the resolution associated with a mouse pointer movement can be adjusted. For example, one zone can be used to switch the resolution of the sensor. Meanwhile, the other zone can be available for other functions. Thus, the user can change the resolution without interrupting the game.

The computer device can be a computer or a mobile terminal. The computer device can also be part of another device or machine or vehicle. In particular, the computer device provides or is part of a human-machine interface (HID). In particular, the computer device comprises at least one graphical user interface (GUI) and, for example, a monitor or display or virtual reality device or the like. In particular, the graphical user interface graphically displays information and, for example, an input made or the effects of an input made.

Preferably, there is bidirectional communication between the computer device and the computer mouse. In particular, the computer mouse can also be controlled by the computer device and preferably vice versa. In particular, the computer device can control the braking device and preferably can specify and/or set a deceleration torque. For this purpose, at least one algorithm and, for example, a software or a driver or the like are stored in the computer device.

In the context of the present invention, damping is also understood to mean a deceleration (in particular increased braking torque) and possibly also a blocking (in particular high braking torque). An unblocking or release is understood to mean in particular an at least partial reduction of the damping (in particular reduction in braking torque) and in particular a cancellation of the damping (in particular no braking torque). In the case of a complete release of the movability of the mouse wheel, the braking device is in particular inactive. Preferably, in the event of a release, a magnetorheological medium is not influenced by a magnetic field actively generated by the braking device. In the event of a complete release, the mouse wheel is in particular (very slightly) freely rotatable (free-wheeling; free-spinning). In addition to a rotational movement, press actuation and/or pull actuation can also be provided for the mouse wheel.

It is possible and preferred that the movability of the mouse wheel is changed in a targeted manner to provide a haptic confirmation of an input made (shortly) beforehand or during the input. In particular, the confirmation occurs depending on the actuation zone. Many different confirmations (feedback) can be provided by adjusting the movability accordingly. For example, the confirmation is provided by a kind of vibration (for example a torque changing quickly over time between low and high) and/or rattling of the mouse wheel.

In accordance with the invention, a rattling is understood to mean in particular an alternating blocking (in particular high braking torque) and release of the movability (in particular low braking torque) of the input element during an actuation or input or during a movement. The blocking and releasing are performed here with a high frequency. In the case of vibrating, a higher frequency can be provided than in the case of the rattling. For example, a frequency of at least 10 Hz or at least 50 Hz or at least 100 Hz or at least 1,000 Hz or more is provided. It can be provided here that different types of confirmations are provided depending on the level of the frequency.

Preferably, the rotatability of the mouse wheel can be decelerated, in particular damped, and blocked and released by means of the braking device in a targeted manner. Preferably, the mouse wheel also has at least one movability transverse to the axis of rotation. For example, a pressing and/or pulling on the mouse wheel can be provided.

In all embodiments, it is particularly preferred that the movability of the mouse wheel can be adjusted from freely movable to completely blocked. Here, the movability or rotatability is completely blocked in the context of the present invention if a movement or rotation is not possible by a force that can be generated manually during an operational use of the computer mouse. In particular, the braking device is suitable and configured for applying a deceleration torque of at least 0.0.05 Nm, and preferably of at least 0.1 Nm, or also at least 1 Nm.

It is preferred that the movability of the input element and in particular the rotatability of the mouse wheel can be, or is, switched between freely rotatable and blocked with a frequency of at least 10 Hz and preferably at least 50 Hz. A frequency of at least 20 Hz or at least 30 Hz or at least 40 Hz is also possible. A frequency of at least 60 Hz or at least 80 Hz or at least 100 Hz can also be provided. Also possible are frequencies of at least 120 Hz or at least 200 Hz or at least 1,000 Hz or more.

For the rotatability of the mouse wheel, in particular at least 25 stop points and preferably at least 50 stop points can be set for each revolution. Also possible are at least 150 or at least 200 or at least 250 or at least 300 stop points. At least 350 or at least 400 stop points can also be provided. The minimally settable angle of rotation between two stop points is in particular a maximum of 20° and preferably a maximum of 10°, and particularly preferably a maximum of 2°. The minimally settable angle of rotation between two stop points can also be a maximum of 1°, or a maximum of 0.5°, or a maximum of 0.1°.

The (in particular magnetorheological) braking device is preferably suitable and configured, in particular by means of a sensor, encoder or incremental encoder, for providing at least 30,000 increments, in particular 60,000 increments/revolution, for one rotation of the mouse wheel. Incremental encoders, for example, provide a specific number of pulses per revolution or even a so-called zero pulse per revolution. These can be incremental encoders with UVW signals or absolute encoders. In this way, haptic signals can be implemented particularly effectively. In particular, the increments can be used to provide the feedbacks and sequences described above. In particular, at least 30,000 increments can be provided per revolution of the braking device. In particular, the sensor means can comprise at least 60,000 increments per revolution of the braking device.

Preferably, the number of stop points is set depending on the actuation zone. The number of stop points can also be set depending on selection options, menu options and/or a number of pages or tabs or the like. In this context, a stop point is provided in particular in that the rotatability of the mouse wheel is at least temporarily decelerated in a targeted manner and in particular is blocked and then released again.

It is possible and advantageous that a rotation angle between the stop points can be set depending on the actuation zone.

In particular, the angle of rotation of the mouse wheel is monitored by means of a sensor device. The sensor device is particularly suitable and configured for detecting the angle of rotation with a resolution of at least 1°, and preferably at least 0.5°, and particularly preferably at least 0.2°, or also preferably at least 0.1°.

In all embodiments, it is particularly preferred that the movability of the mouse wheel can be, or is, adapted in real times. In particular, the braking device is suitable and configured for changing the deceleration by at least 30% within less than 100 milliseconds. In particular, the deceleration is changeable within less than 10 milliseconds by at least 10, preferably by at least 30%, and particularly preferably by at least 50%. The deceleration can also be variable within less than 100 milliseconds by at least 100% or 500% or by a factor of ten or a thousand. Such real-time control is of particular advantage for working with the computer mouse.

In particular, the control device is suitable and configured for adapting a deceleration torque of the braking device in order to damp the movement in a targeted manner. In particular, the control device is suitable and configured for adjusting the deceleration torque dynamically and preferably adaptively.

Preferably, the control device can set any deceleration torque that can be generated with the braking device for any angle of rotation that can be achieved with the mouse wheel and/or for an adjustable duration (in particular torque over angle of rotation and time). In particular, the control device comprises a plurality of settable operating modes and is preferably suitable and configured for assigning deceleration torque and angle of rotation and/or duration depending on the operating mode and/or the control command.

In particular, the computer mouse comprises at least one control device for controlling the braking device. By means of the control device, the damping generated by the braking device can be adjusted in particular in a targeted manner. The control device is in particular an electronic control device. In particular, the control device comprises at least one control algorithm. In particular, the adjustment of a deceleration torque is carried out by controlling an electric coil device of the braking device with a specific current and/or a specific voltage or a suitable signal. In all embodiments, the increasing and/or decreasing of the deceleration torque can be carried out continuously or variably (over time and/or angle).

In a particularly advantageous embodiment, the control device is suitable and configured for decelerating and releasing the movement of the mouse wheel by means of the braking device in a targeted sequence. To implement such a sequence, the control device is in particular suitable and configured for setting different deceleration torques for the deceleration and the release. Such a sequence (ripple) provides reliably perceptible haptic feedback even under difficult operating conditions and can be implemented particularly well with the invention.

In particular, the sequence is composed of a sequence of relative maxima with higher deceleration torque and relative minima with lower deceleration torque. In particular, an angular spacing of a period of adjacent relative maxima is adjustable and is set. In particular, the progression of the deceleration torque over a period is set depending on a set operating mode. Such a sequence with particularly short intervals can also be referred to as ripples/ticks. In particular, such a sequence is formed from a defined combination of deceleration torques depending on time and/or angle. Preferably, the deceleration torques for the deceleration and/or the release are set depending on time and/or depending on angle and/or depending on a control command.

The deceleration torques of the sequence are started and/or held and/or terminated in particular depending on angle and/or time. Preferably, an alternation of such dependencies within a sequence can also be provided. For example, the start of the sequence is angle-dependent or time-dependent, and the length of the sequence is then set depending on time or angle.

Preferably, the control device is suitable and configured for starting the deceleration torques of the sequence in an angle-dependent manner and for maintaining them in a time-dependent manner. In particular, the control device is suitable and configured for omitting a setting of a deceleration torque provided in the sequence if an angular position (specific angle of rotation of the mouse wheel) provided for the start is overshot during the maintenance of a deceleration torque.

Particularly preferably, the control device is suitable and configured for adjusting the different deceleration torques of the sequence with a targeted frequency and preferably with such a frequency that the movement of the mouse wheel is damped with a targeted vibration. In particular, the frequency is at least 20 Hz and preferably at least 50 Hz.

In particular, the control device is suitable and configured for dynamically adjusting the different deceleration torques of the sequence over time and/or the angle and/or the speed of movement (angular velocity) of the mouse wheel and/or the number of deceleration torque settings already made.

The control device is particularly suitable and configured for setting a sequence with specifically changing deceleration torques. In particular, a sinusoidal or cosinusoidal profile is provided for this purpose. In particular, the profile has a (slight) offset in the negative. The offset is in particular less than 30%, and in particular less than 20%, and preferably less than 10%. In particular, at least two zero crossings per period are provided for the profile. In particular, the braking device is controlled with a sine or cosine signal, in particular with a predetermined and in particular adjustable (slight) offset from the zero point.

The braking device comprises in particular at least one magnetic field-sensitive magnetorheological medium (MR fluid) and at least one (magnetic) field generation device for generating and controlling a field strength. The field generation device and the medium in particular influence the movability of the mouse wheel in a targeted manner.

In all embodiments it is possible and advantageous that the braking device, in particular the mouse wheel, is at least partially surrounded by at least one display device. The braking device can be surrounded by the display device on one side or on two (opposite) sides or on three sides or on four sides and/or completely. The braking device can be at least partially surrounded by the display device in a spaced-apart and/or contacting manner. The display device is in particular a (in particular touch-sensitive) display or comprises at least one such display. In particular, the braking device is at least partially integrated into the display device.

In particular, the display device is suitable and configured for displaying a content depending on the actuation zone from which the mouse wheel is actuated and/or depending on which actuation zone was previously activated. In particular, the display device is suitable and configured for displaying a particular operating mode and particularly preferably a (current) particular function assignment of the actuation zones.

In particular, an axis of rotation of the braking device is set back relative to an outer surface of the display device. In particular, the mouse wheel protrudes by less than half of its diameter or circumference from the outer surface of the display device.

The applicant reserves the right to claim a remote control, in particular a games controller, for carrying out inputs into a receiving device which can be coupled to the remote control. The remote control comprises at least one body that can be at least partially gripped and at least one remote control wheel at least rotatably mounted on a support structure of the body. The remote control wheel can be rotated by means of at least one finger to carry out an input. In this regard, the remote control wheel comprises at least two actuation zones. The remote control wheel can also comprise three or four or five or more actuation zones. In this case, a movement of the remote control wheel can be damped in a targeted manner by means of at least one controllable (in particular magnetorheological) braking device depending on the actuation zone from which the remote control wheel is actuated and in particular rotated and/or depending on which actuation zone was previously activated. The remote control can be designed as a TV remote control and/or hi-fi remote control and/or games console remote control and/or as a remote control for other electronic devices, preferably consumer electronic devices.

In the context of the present invention, the terms "mouse wheel" and "mouse body" can be replaced by the terms "remote control wheel" and "body" throughout at least the general description and, where appropriate, the exemplary embodiments. Thus, the description can be used to explain the remote control correspondingly to better understand the invention with its advantages. The method according to the invention can also be configured for operating the smart device.

The remote control according to the invention also offers many advantages. Preferably, the remote control wheel is designed analogously to the previously described mouse wheel, in particular with regard to the actuation zones. In particular, the (in particular magnetorheological) braking device of the remote control is also designed as previously described for the computer mouse.

The remote control can preferably be configured for operating TV sets and/or other types of entertainment devices, for example games consoles. For example, one actuation zone is assigned the volume setting and the other actuation zone is assigned a channel selection. Preferably, these actuation zones are adjacent to each other. However, they can also be spaced apart by at least one further actuation zone. For example, at least one (middle) actuation zone can be provided for menu selection. In this case, a preferred volume or one that is suitable for a particular movie, for example, can be communicated haptically to the user as an aid or suggestion by a short, stronger torque spike. For example, a torque spike for a preferred channel can be output haptically via the remote control wheel when zapping through the channels and reaching the preferred channel.

Channels on which, for example, commercials are broadcast can be skipped while scrolling; channels on which preferred movies are being shown can be selected or marked by a haptic feedback (for example short barrier or high torque). In all embodiments it is preferred that preferred menu items (favorites) can be haptically marked (for example by torque spikes).

An embodiment with three actuation zones is also possible. For example, menus can then be selected with the third actuation zone. Such a remote control is also particularly advantageous for selecting applications on a smart TV. Preferred channels or applications can be haptically marked, for example, with a detent point and/or with stop points. Similar functions can also be implemented on a games controller.

In the remote control configuration, the rotary unit can also be surrounded by a display. The display can then show, for example, what can currently be changed. If the remote control is used, for example, to change the settings of a radio, the display shows the corresponding pictures, for example a play symbol, a forward and back symbol, a mute button, etc.

The applicant reserves the right to claim a smart device (also referred to as a mobile terminal), in particular a smartphone, comprising at least one body that can be at least partially gripped and at least one wheel at least rotatably mounted on a support structure of the body. The wheel can be rotated by means of at least one finger to carry out an input. In this regard, the wheel comprises at least two actuation zones. The wheel can also comprise three or four or five or more actuation zones. In this case, a movement of the wheel can be damped in a targeted manner by means of at least one controllable (in particular magnetorheological) braking device depending on the actuation zone from which the wheel is actuated and in particular rotated and/or depending on which actuation zone was previously activated. In particular, the wheel can be suitable and configured for operating the smartphone itself and/or for operating devices that can be coupled to the smartphone.

In the context of the present invention, the terms "mouse wheel" and "mouse body" can be replaced by the terms "wheel" and "body" throughout at least the general description and, where appropriate, also in the exemplary embodiments. Thus, the description can be used to explain the smart device correspondingly to better understand the invention with its advantages. The method according to the invention can also be configured for operating the smart device.

In all embodiments of the invention, it is possible that a pressure intensity is also detected and taken into account for the input. For example, if the pressure is only light, an input is begun or a function is selected and/or started. A stronger pressing can be provided, for example, for confirmation or execution of a command. In particular, the haptic feedback changes depending on the selected function. This has the advantage that the user can recognize what he has selected and what he is setting.

In all embodiments of the invention, it is possible for the computer mouse to be permanently integrated into a device and, for example, notebook computer. For example, the computer mouse can then be provided by a mouse wheel integrated in a touchpad.

In all embodiments of the invention, it is possible that the rotatability of the mouse wheel is drivable by means of at least one drive device. In particular, the mouse wheel is thereby actively rotatable about its axis of rotation. In particular, the drive device comprises at least one motor, for example electric motor, pneumatic drive, ultrasonic motor, piezo actuator, or linear motor. Preferably, the drive device is provided in addition to the braking device. This has the advantage that the mouse wheel can be moved actively as well as braked with the (in particular magnetorheological) braking device in a power-saving manner. It is also possible that the braking device is replaced by the drive device (in particular its motors).

The drive device can be controlled in particular depending on at least one control command. In particular, the drive device can convert the control command into at least one haptic signal (force feedback) that can be perceived at the mouse wheel.

In the context of the present invention, actuation with a finger is understood to also mean, in particular, actuation with another part of the body and indirect actuation with an aid and, for example, with a stylus or the like.

Further advantages and features of the present invention will become apparent from the description of the exemplary embodiments, which are explained below with reference to the accompanying figures.

BRIEF DESCRIPTION OF THE FIGURES

FIG. 8 shows a sketch of a current profile of the braking device over time;

FIG. 9 shows a further sketch of a current profile of the braking device over time;

FIG. 10 shows a purely schematic representation of a smart device according to the invention in a plan view;

DETAILED DESCRIPTION OF THE INVENTION

Figure 1A:
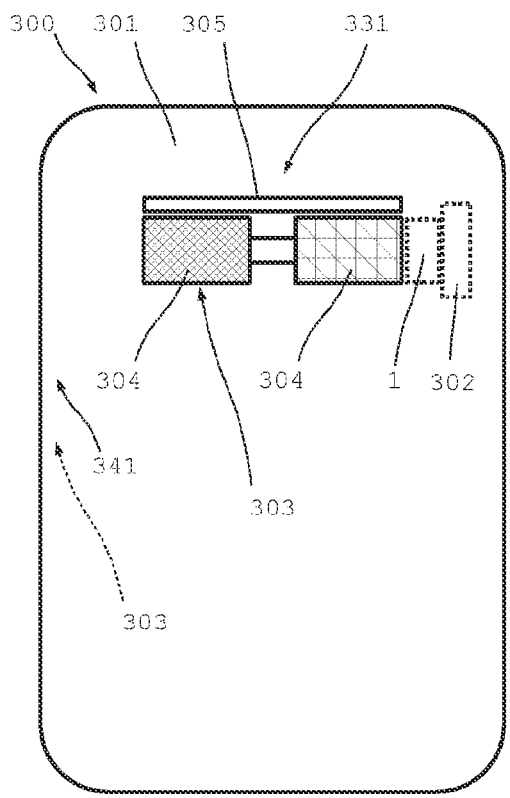
FIGS. 1a-1d show purely schematic representations of computer mice according to the invention in a plan view.

FIGS. 1a to 1d show computer mice 300 according to the invention, which are equipped with magnetorheological braking devices 1 (not visible here) arranged in the interior. The computer mice are operated by the method according to the invention.

The braking devices 1 serve to damp a rotational movement of a mouse wheel 303 of the particular computer mouse 300 in a targeted manner. The mouse wheel 303 is rotatably mounted on a support structure 302 (not visible) arranged inside a mouse body 301.

In FIG. 1a, the computer mouse 300 is equipped with a roller-like mouse wheel 303 with two actuation zones 304.

The actuation zones 304 differ here, for example, in their surface structure. Here, the actuation zones 304 are arranged axially adjacently to each other and spaced apart on a common axis of rotation.

The rotational movement (torque) of the mouse wheel 303 can be damped here in a targeted manner depending on the actuation zone 304 from which the mouse wheel 303 is rotated. A monitoring device 305, for example with a proximity sensor or touch sensor, detects which of the actuation zones 304 is being used for the rotation.

Figure 1B:
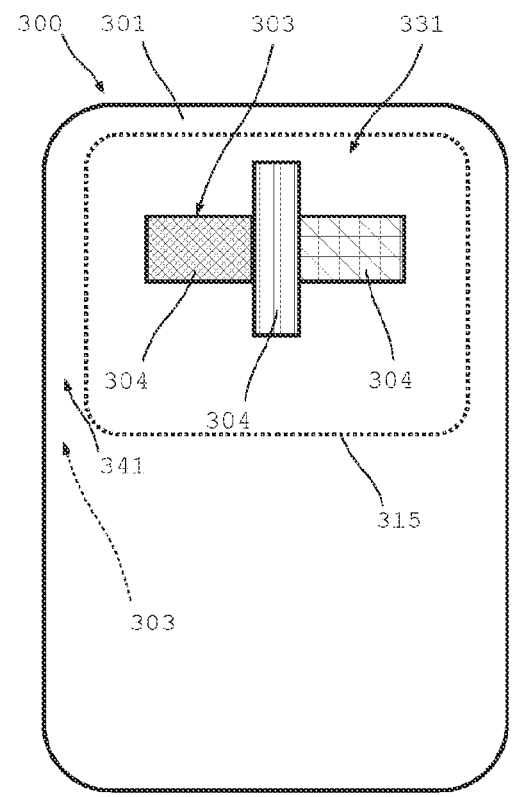

The computer mouse 300 shown in FIG. 1b differs from the previously described computer mouse 300 by way of a mouse wheel 303, which here has three actuation zones 304. The middle actuation zone 304 is equipped here with a significantly enlarged diameter. In addition, the actuation zones 304 have different surface structures.

In addition, a gesture recognition zone 315 of the monitoring device 305 is sketched here. Thus, the monitoring device 305 recognizes where the finger and/or hand is located and takes this into account for the activation of the actuation zone 304. Additionally or alternatively, an input can also be made by a corresponding recognizable gesture. Thus, the input is then made by the gesture itself. For example, a pressing on the mouse wheel ("push") can be carried out by a gesture and for example a wiping with the hand in the air. Such a design can also be advantageously combined with the other embodiments presented here.

Figure 1C:
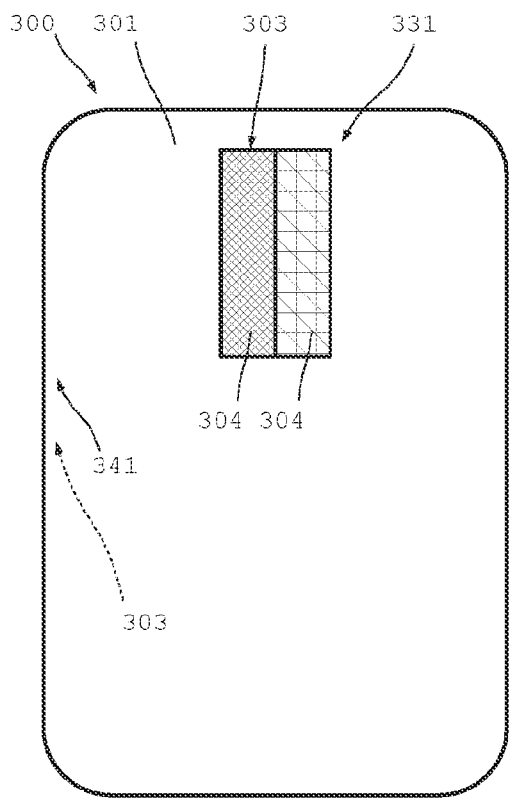

FIG. 1c shows an embodiment of the computer mouse 300 described in FIG. 1a, in which the mouse wheel 303 has a typical mouse wheel shape and comprises two actuation zones 304. Here, the actuation zones 304 are ring-shaped and can be beveled in some regions. In this way, a comfortable positioning of the finger and at the same time a good haptic differentiation of the zones 304 is possible during operation.

In the computer mice 300 described above, the mouse wheel 303 is disposed in a first contact portion 331 of the mouse body 301, which is accessible with the index finger when the mouse body 301 is gripped as intended.

Figure 1D:
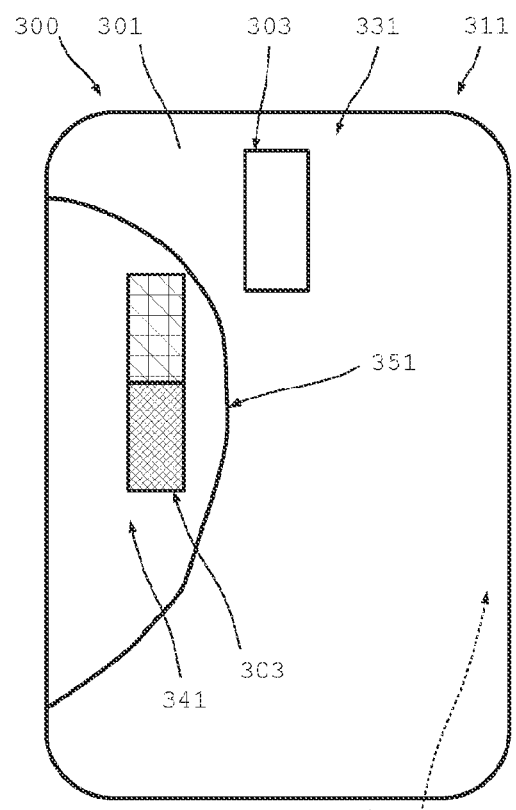

FIG. 1d shows an embodiment of the computer mouse 300 described in FIG. 1a, in which the mouse wheel 303 is arranged in a second contact portion 341 of the mouse body 301. This contact portion 341 is accessible with the thumb when the mouse body 301 is gripped as intended. The second contact portion 341 is formed here as a recess 351 arranged on the left side of the mouse body. The actuation zones 304 are also arranged axially side by side here on a common axis of rotation.

The mouse body 301 of FIG. 1d has a left-handed arrangement 311 of the mouse wheel 303 optimized for right-handed users. For this purpose, the mouse wheel 303 can be reached particularly well with the thumb of the right hand. In an arrangement 321 optimized for left-handed users, which is merely indicated here, the mouse wheel 303 would then be arranged on the right-hand side of the mouse body 301.

In addition, the computer mouse 300 of FIG. 1d can also be equipped with another mouse wheel 303, which is merely indicated here, in the first contact portion 331. This mouse wheel 303 can have at least two or only one actuation zone 304.

Such a mouse wheel 303 for the thumb, as shown in FIG. 1d and which is arranged in the second contact portion 341, can also be provided in the computer mice 300 described with reference to FIGS. 1a to 1c. This mouse wheel 303 can have at least two or only one actuation zone 304.

Figure 1E:
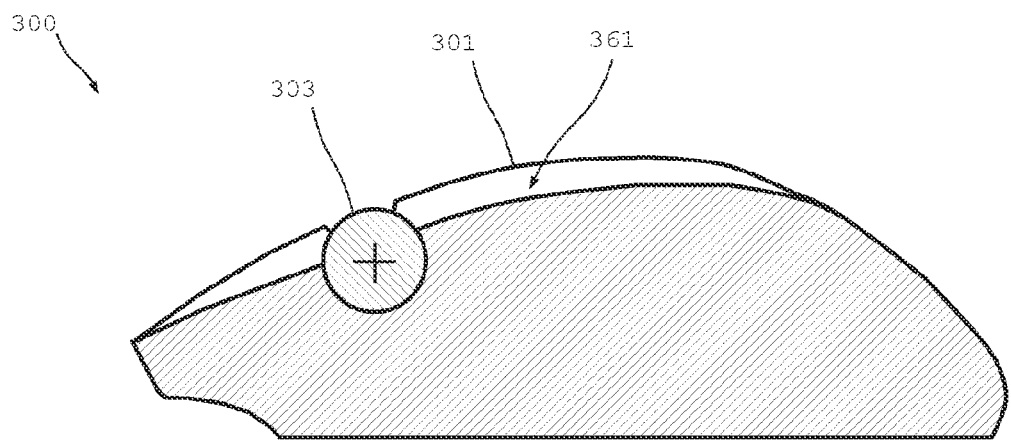
FIG. 1e shows a purely schematic representation of a computer mouse in a sectional side view.

FIG. 1e shows an embodiment of the computer mouse 300 in which the mouse body 301 has an indentation 361 extending in the longitudinal direction. As a result, the middle actuation zone 304 is exposed here over a larger circumferential angle than its axially adjacent actuation zones 304. Thus, more of the middle actuation zone 304 is exposed here than the others. Thus, it can be reliably sensed where on the mouse wheel 303 or in which actuation zone 304 the finger is currently located. The mouse wheel 303 can have a constant diameter or different diameters.

Figure 1F:
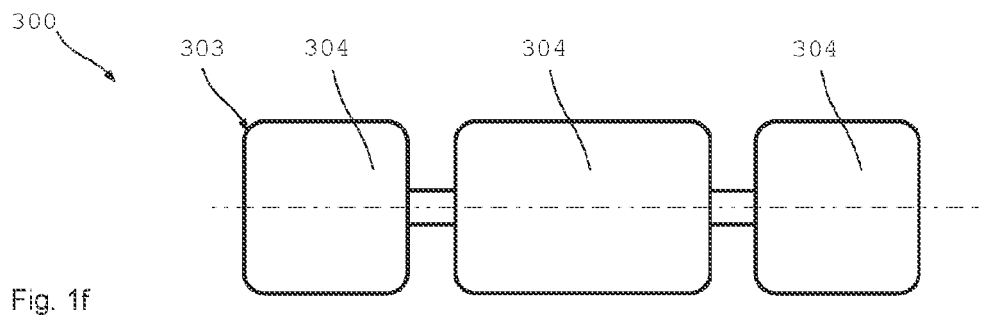
FIGS. 1f-1h show purely schematic representations of mouse wheels of computer mice according to the invention.

FIG. 1f shows a mouse wheel 303 with three spaced apart (cylindrical) actuation zones 304. The actuation zones 304 have the same diameter here. The axis of rotation is shown as a dot-and-dash line.

Figure 1G:
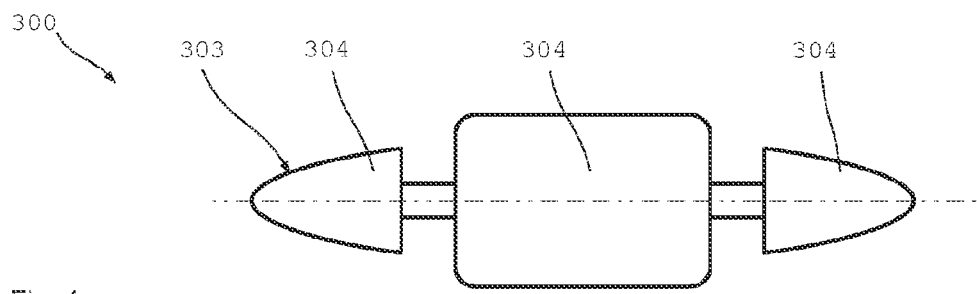

FIG. 1g shows a mouse wheel 303 with three spaced-apart actuation zones 304. The middle actuation zone 303 is here cylindrical in shape. The lateral actuation zones 304 are conical in shape here. The mouse wheels 303 of FIGS. 1f and 1g are particularly advantageously suited for the computer mouse 300 of FIG. 1e.

Figure 1H:
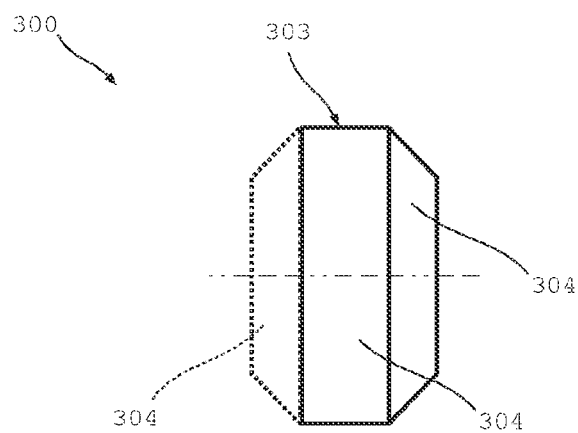

FIG. 1h shows a mouse wheel 303 that is beveled on one axial side. The mouse wheel 303 can also be beveled on both axial sides (shown by a dashed line). This results in a cylindrical actuation zone 304, which is followed by conical actuation zones 304 on one or both sides. For example, once the beveled actuation zone 304 is touched, scrolling can occur without detent effect. If, on the other hand, the cylindrical or middle actuation zone 304 is touched, scrolling with detent effect can take place.

When operating the computer mice 300 shown here, many advantages result. Depending on the opened application, important functions, for example, are assigned to the actuation zones 304. In a drawing program, for example, the left actuation zone 304 can be used to select the color, and the right actuation zone 304 can be used to select the tool. The middle actuation zone 304 is used for example for zooming. Depending on the number of colors/tools, the mouse wheel 303 then receives a different ripple or a different detent effect.

If, for example, an IDE (integrated development environment) is now opened, the left portion is used to select an element from the toolbox.

For example, the taskbar can be displayed when touching an actuation zone 304. The selection of user-selected buttons (word processing, browser, calendar, etc.) is facilitated by means of haptic feedback. When working with multiple programs or windows or even browser tabs, the actuation zone 304 of the mouse wheel 303 can be used for navigation. Preferred or frequently used or useful windows or tabs are expressed haptically differently (different haptic feedback).

In advantageous embodiments, the assignment of the actuation zones 304 can be programmed by the user. This function is then retained. For example, the volume can always be adjusted with the left actuation zone 304. Here, the higher the volume becomes, the harder the turning may become. The design of the mouse wheel 303 as a rocker can replace for example left and right clicking.

In the following, the braking device 1 for damping the mouse wheel 303 is presented in more detail. The mouse wheels 303 described below for this purpose each have two or more actuation zones 304, which, for reasons of clarity, are not shown in more detail.

Figure 2:
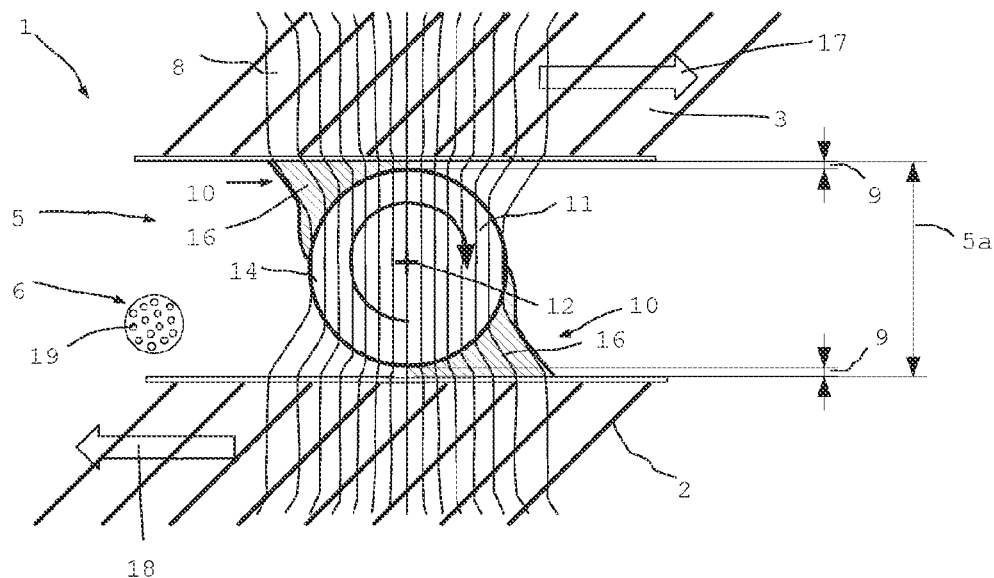
FIG. 2 shows a highly schematic cross-section through a rolling element of a magnetorheological braking device.

FIG. 2 shows a highly schematic cross-sectional view of a magnetorheological braking device 1 of a computer mouse 300 according to the invention. Here, the braking device 1 comprises two braking components 2, 3. One of the braking components 2, 3 here provides or carries the mouse wheel 303. Thus, the operation is carried out here at least by direct or also indirect rotation of one of the braking components 2, 3.

The magnetorheological braking device 1 is used to influence the transmission of force between the braking components 2 and 3. Here, a rolling element or rotary body 11 is provided between the two braking components 2 and 3 in FIG. 2. The rolling element 11 is designed here as a ball 14. However, it is also possible to design rolling elements 11 as cylinders or ellipsoids, rollers or other rotatable rotary bodies. Rotary bodies which are not rotationally symmetrical in the true sense, such as a gearwheel or rotary body 11 with a specific surface structure, can also be used as rolling elements. The rolling elements 11 are not used to provide support relative to each other, but for transmitting torque.

A channel 5 is provided between the braking components 2 and 3 and is filled here with a medium 6. The medium here is a magnetorheological fluid which comprises as carrier fluid, for example, an oil in which ferromagnetic particles 19 are present. Glycol, grease, water and viscous substances can also be used as a carrier medium without being limited thereto. The carrier medium can also be gaseous or the carrier medium can be dispensed with (vacuum). In this case, only particles that can be influenced by the magnetic field are filled into the channel.

The ferromagnetic particles 19 are preferably carbonyl iron powders, wherein the size distribution of the particles is dependent on the specific application. Specifically, a distribution of the particle size between one and ten micrometers is preferred, wherein larger particles of twenty, thirty, forty and fifty micrometers are also possible. Depending on the application, the particle size can also be significantly larger and can even enter the millimeter range (particle spheres). The particles can also have a special coating/casing (titanium coating, ceramic casing, carbon casing, etc.) so that they can better withstand the high pressure loads that occur depending on the application. For this application, the magnetorheological particles can be produced not only from carbonyl iron powder (pure iron) but also, for example, from special iron (harder steel).

The rolling element 11 is preferably set in rotation about its axis of rotation 12 by the relative movement 17 of the two braking components 2 and 3 and runs practically on the surface of the braking component 3. At the same time, the rolling element 11 runs on the surface of the other braking component 2, so that a relative speed 18 exists there.

Strictly speaking, the rolling element 11 has no direct contact with the surface of the braking components 2 and/or 3 and therefore does not roll directly on them. The free distance 9 from the rolling element 11 to one of the surfaces of the braking components 2 or 3 is, for example, 60 µm. In a specific embodiment with particle sizes between 1 µm and 10 µm, the free distance is in particular between 10 µm and 300 µm, and particularly preferably between 40 µm and 120 µm.

In particular, the free distance 9 is at least ten times the diameter of a typical average particle diameter. Preferably, the free distance 9 is at least ten times the diameter of a largest typical particle. The lack of direct contact results in a very low basic friction/force/torque when the braking components 2 and 3 move relative to each other.

If a magnetic field is applied to the magnetorheological braking device 1, the field lines are formed depending on the distance between the rolling elements 11 and the braking components 2, 3. The rolling element 11 consists of a ferromagnetic material and, for example, here of ST 37 (S235). The steel type ST 37 has a magnetic permeability µr of about 2000. The field lines (magnetic circuit) pass through the rolling element and concentrate in the rolling element. At the, in this case, radial entry and exit surface of the field lines on the rolling element, there is a high magnetic flux density in the channel 5. The inhomogeneous and strong field there leads to local and strong crosslinking of the magnetically polarizable particles 19 (magnetic chaining). Due to the rotational movement of the rolling element 11 in the direction of the forming wedge (heaping) in the magnetorheological fluid, the effect is greatly increased and the possible braking or coupling torque is extremely increased, far beyond the amount that can normally be generated in the magnetorheological fluid. Preferably, rolling elements 11 and braking components 2, 3 consist at least in part of ferromagnetic material, and therefore the smaller the distance between rotary bodies 11 and braking components 2, 3, the higher the magnetic flux density. This results in the formation of a substantially wedge-shaped region 16 in the medium, in which the gradient of the magnetic field increases sharply towards the acute angle at the contact point or the region of smallest distance.

Despite the distance between rolling element 11 and braking components 2, 3, the speed of the surfaces relative to each other can cause the rolling element 11 to rotate. The rotary motion is possible without and also with an acting magnetic field 8.

When the magnetorheological braking device 1 is subjected to a magnetic field 8 of an electric coil 26, not shown here in FIG. 2, the individual particles 19 of the magnetorheological fluid 6 chain together along the field lines of the magnetic field 8. It should be noted that the vectors drawn in FIG. 2 only roughly schematically represent the range of field lines relevant for influencing the MRF. The field lines enter the channel 5 substantially normal to the surfaces of the ferromagnetic components and need not be straight, especially in the acute-angled region 10.

At the same time, some material from the magnetorheological fluid is also rotated on the circumference of the rolling element 11, so that an acute-angled region 10 is formed between the braking component 3 and the rolling element 11. On the other side, an equal, acute-angled region 10 is formed between the rolling element 11 and the braking component 2. The acute-angled regions 10 can have a wedge shape 16, for example, in the case of rolling elements 11 of cylindrical design. Due to the wedge shape 16, the further rotation of the rolling element 11 is impeded, so that the effect of the magnetic field on the magnetorheological fluid is increased, since the acting magnetic field within the acute-angled region 10 results in a stronger cohesion of the medium 6 there. As a result, the effect of the magnetorheological fluid in the accumulated heap is increased (the chain formation in the fluid and thus the cohesion or viscosity), which makes further rotation or movement of the rotary body 11 more difficult.

The wedge shape 16 (particle accumulation) allows much greater forces or moments to be transmitted than would be possible with a comparable design that uses only the shear motion without the wedge effect.

The forces that can be transmitted directly by the applied magnetic field represent only a small part of the forces that can be transmitted by the device. The magnetic field can be used to control the wedge formation and thus the mechanical force amplification. The mechanical amplification of the magnetorheological effect can go so far that force transmission is possible even after an applied magnetic field has been switched off when the particles have been wedged.

It has been found that a considerably greater effect of a magnetic field 8 of a certain strength is obtained by the wedge effect of the acute-angled regions 10. In this case, the effect can be amplified many times over. In one specific case, an influence on the relative velocity of two braking components 2 and 3 with respect to each other approximately ten times as strong as in the prior art was observed for MRF couplings based on the shear principle, in which a magnetorheological fluid is arranged between two surfaces moving with respect to each other and is subjected to the shear forces of the surfaces moving with respect to each other. The possible amplification here due to the wedge effect depends on various factors. If necessary, it can be further reinforced by a greater surface roughness of the rolling elements 11. It is also possible that outwardly projecting protrusions are provided on the outer surface of the rolling elements 11, which can lead to even greater wedge formation.

The wedge action or wedge effect is distributed areally over the rolling element 11 and components 2 or 3.

Figure 3:
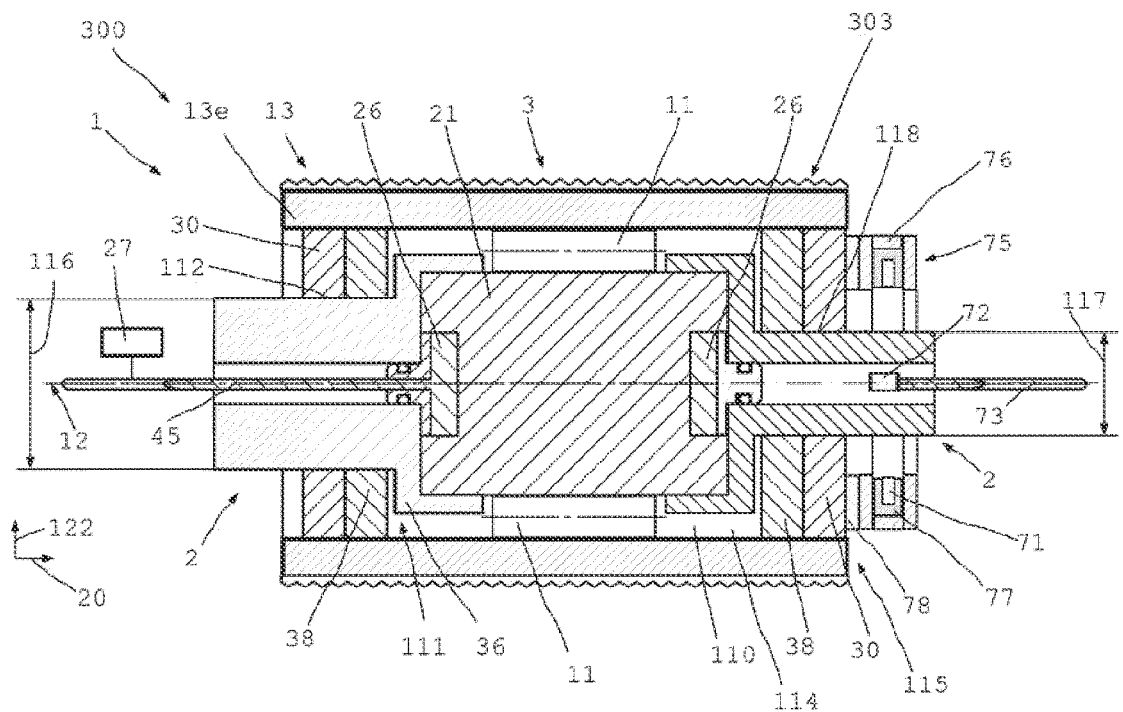
FIG. 3 shows a schematic cross-section through a braking device.

FIG. 3 shows a section through a computer mouse 300 in the region of the magnetorheological braking device 1 of the mouse wheel 303. The braking device 1 has two braking components 2 and 3. The first braking component 2 and the second braking component 3 extend substantially in an axial direction 20. The first braking component 2 is arranged here inside the second braking component 3 and is held interlockingly and/or in a frictionally engaged manner by a holder 4. The holder 4 is attached regularly to the support structure 302 of the computer mouse 300.

The second braking component 3 is received on the first braking component 2 so as to be continuously rotatable relative thereto. Here, the second braking component 3 forms the rotatable mouse wheel 303 or is connected thereto for conjoint rotation.

The second braking component 3 is elongate and has the rotary part 13 and a magnetically conductive sleeve part 13e therein.

The second braking component 3 is received rotatably at the first bearing point 112 and at the second bearing point 118 on the second braking component 2 and can also be axially displaceably mounted. Forces in a global radial direction 122 can be supported at the bearing points 112, 118 by the bearings 30, while the first braking component 2 is displaceable axially relative to the second braking component 3. The diameter 116 of the first bearing point 112 is here approximately twice as large as the diameter 117 of the second bearing point 118.

The second braking component 3 is led out at both ends. A closed chamber 110 filled with a magnetorheological fluid (MRF) is formed between the braking components 2 and 3. In the region of the first end 111 of the chamber 110, a cylindrical running surface is formed on the holder 4 as a first bearing point 112. A hardened surface or a surface of corresponding quality is present there. A bearing 30 for rotatably supporting the second braking component 3 is attached to this cylindrical running surface 37. Further inward in the axial direction 20, a seal 38 is provided adjacently to the bearing 30. The seal 38 reliably seals the interior.

Another bearing option is the bearing on the outer housing of the MRF brake. In this way, the shaft on which the torque must be dissipated is not loaded. There is no bending of the parts inside the brake (displacement of the axle against the casing. The friction radius is thus increased, but installation space is saved in the axial length, since no axle stub has to protrude from the sleeve for bearing.

The first braking component 2 has a main body 33. The windings of an electric coil 26 are wound around the core 21. The individual windings of the electric coil 26 protrude outwardly beyond the cylindrical main body 33 (see FIG. 5).

Radially, there is a gap 5 between the outer wall of the first braking component 2 and the inner wall of the sleeve part 13, said gap being designed here substantially as a hollow-cylindrical gap. A plurality of transmission components 11, which are designed here as rolling elements, are arranged in the gap. The rolling elements 11 are designed here as cylindrical rolling elements and have an outer diameter that is somewhat smaller than the gap width of the gap 5. The gap 5 is furthermore filled here with a magnetorheological medium.

In one region of the gap, for example, an O-ring or the like filled with air or another gas can be arranged to provide volume compensation in the event of temperature fluctuations. In addition, a reservoir is thereby formed there, in case magnetorheological fluid or medium escapes from the interior to the outside during operation. Here, the design is used to provide automatic temperature compensation and a reservoir for MRF by way of the differently sized diameters 116, 117.

The (usable) gap length of the gap 5 is here greater than the length of the rolling elements 11. Here, too, the electric coil in the axial direction 20 is longer than the length of the rolling elements 11.

The core 21 can be seen inside the electric coil 26. The holder 4 has a radially enlarged receptacle 36 (diameter 36a, see FIG. 4) for non-rotatably receiving the first braking component 2. Through the holder 4, a cable bushing extends downwardly through the holder 4. Cables 45 for connecting the electric coil 26 and, if necessary, sensor lines are led out there. A control device 27 can be provided or associated in the base of the holder 4 or at other suitable locations to provide control as required.

A closed chamber 110 is formed between the first end 111 and the second end 115. The closed chamber 110 comprises the volume 114, which is substantially completely filled with the magnetorheological medium 6.

In this case, a change in the volume of the magnetorheological medium 6 results in a relative axial displacement of the first braking component 2 with respect to the second braking component 3 due to the different diameters 116, 117 of the two bearing points 112, 118.

In the event that the first braking component 2 is fixed, the second braking component 3 is displaced to the right in the orientation of FIG. 3 in the event of an increase in volume. A small part of the first braking component 2 with the diameter 116 at the first bearing point 112 exits the closed chamber 110, while a part of the first braking component 2 at the second end 115 with the significantly smaller diameter enters the closed chamber 110. The end result is that the volume 114 of the closed chamber 110 is increased. In this way, in particular, it is possible to compensate for a change in volume of the magnetorheological medium 6 caused by a rise in temperature. A function of the magnetic field generation device 113 is not affected by this. In the event of a decrease in volume, which can be caused by temperature or also by a leakage, the second braking component 3 is displaced to the left here.

During the displacement, ambient pressure practically always prevails within the magnetorheological braking component 1. Above all, this prevents additional stress on the seals 38. With a balancing device via a gas bubble, on the other hand, the interior is always under positive pressure, resulting in higher leakage and higher friction due to the better seal required and/or due to the pressure on the sealing lip.

A compensation channel 120 can be provided, which connects the regions near the bearing points 112, 118. In this way, if the magnetorheological medium 6 is displaced, the throttling effect of the gap is reduced, provided that the gap should be very small.

Furthermore, the magnetorheological braking device 1 has a sensor device 70 at least for detecting an angular position of the two braking components 2, 3 relative to each other. The detection is carried out with a magnetic ring unit 71 and by means of a magnetic field sensor 72. The sensor device 70 is connected here to the second braking component 3 via a decoupling device 78. The decoupling device 78 magnetically decouples the sensor device. The sensor device 70 here further comprises a shielding device 75, which here comprises a plurality of shielding bodies 76 and which surrounds the magnetic ring unit 71 on three sides. A separation unit 77 is provided between the magnetic ring unit and the shielding device 75. The separation unit 77 additionally shields the magnetic ring unit 71. As a result, the volume spanned by the magnetic ring unit 71 is largely shielded from magnetic influences of the electric coil 26 or other magnetic fields.

Figure 4:
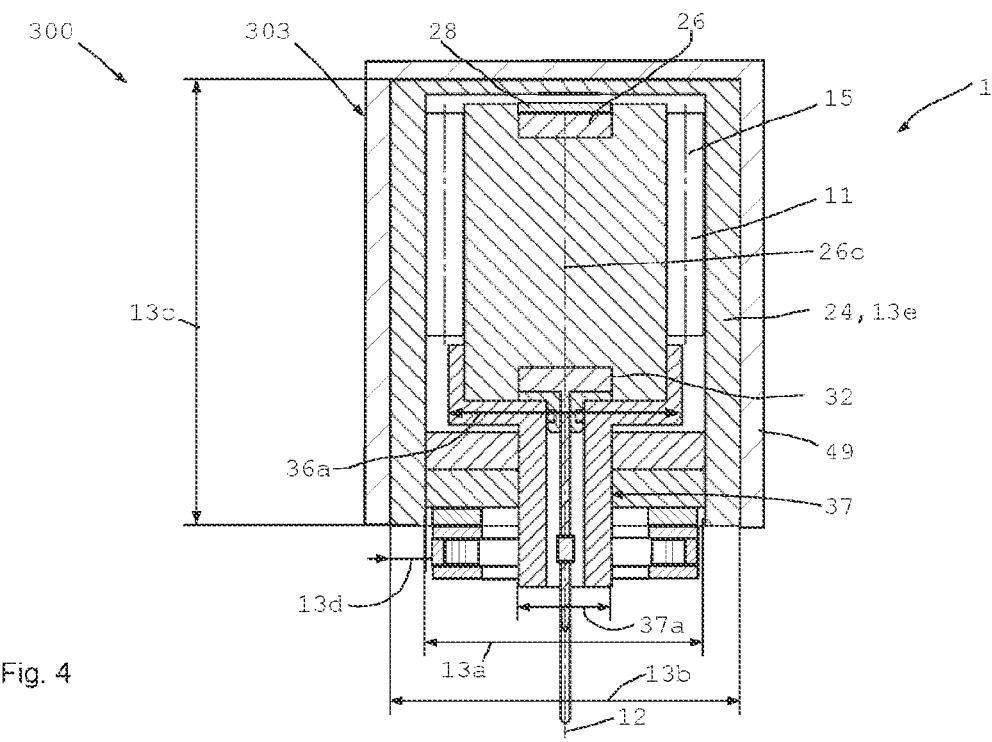
FIG. 4 shows a cross-section of another braking device.

FIG. 4 shows another computer mouse 300 in section with a similar magnetorheological braking device 1. The mouse wheel 303 is either rotatably received on one side on the support structure 302 or an axle stub is also formed on the second end to rotatably support the mouse wheel 303 on both sides.

The transverse grooves 32 in which the electric coil 26 is wound at the axial ends of the core 21 can be seen. In the axial direction, potting compound 28 is provided at each end for termination. In the region of the cable bushing 35, a separate seal is provided via, for example, the O-ring or the like shown.

It is also possible that individual rolling elements distributed over part of the circumference are designed as magnetically non-conductive transmission components. Preferably, all rolling elements are made of magnetically conductive material such as steel.

A length or height 13c of the rotary part 13 and of the sleeve part 13e or the second braking component 3 in the axial direction 20 is preferably between 3 mm and 90 mm, and in particular between 5 mm and 30 mm. Externally, a coating 49 can be provided on the second braking component 3, such that the external appearance of the mouse wheel 303 is substantially determined by the surface of the coating 49. Different segments can be distinguished by different surfaces.

The material of the sleeve part 13e or of the rotary part 13 as a whole is magnetically conductive and serves to close the magnetic circuit. A wall thickness 13d of the sleeve part 13e is preferably at least half as large as a diameter of the rolling elements 11.

The diameter 36a of the receptacle 36 is preferably substantially larger than the diameter 37a of the cylindrical running surface 37. The friction at the seal 38 is thus reduced. In addition, standardized bearings can be used.

It is also possible to make the core 21 and also the holder 4 in two parts. Preferably, the separation runs along the center line drawn in FIG. 11, resulting in a left and right (core) half. The two core halves can be spaced apart from one another by a magnetically non-conductive element (for example seal). Preferably, the potting compound volume 28 is then a part of the core half/halves, resulting in a semicircular element with a circumferential groove on the parting surface for the electric coil. Further preferably, the receptacle 36 is also separated into two halves. One receptacle half can also form a part (can be made in one piece) with a core half, or a core half can be embodied in one piece with a complete receptacle unit 36.

Here, the mouse wheel 303 is supported on one side by the magnetorheological braking device 1. Here, the second braking component 3 is only received at the first end of the closed chamber 110 at an end portion 121 of the first braking component 2, that is to say, the second braking component 3 is only supported at the first bearing point 112 by the bearing 30. When the volume within the closed chamber is changed, the second braking component 3 can easily move back and forth. Here it is again assumed that the first braking component 2 is stationary. In this case, a portion of the diameter 116 of the first braking component 2 extends or retracts at the first bearing point 112. The volume 114 of the closed chamber 110 changes. Advantageously, the system is virtually always at ambient pressure within the given range of motion. Additional loading on the seal 38 is prevented.

FIGS. 5a to 5d show various schematic cross-sections of the magnetorheological braking device 1 which are advantageously usable for the computer mouse 300.

The inner braking component 2 is of fixed design and is surrounded by the continuously rotatable braking component 3. The second braking component 3 has a rotary part 13 which rotates around the first braking component and is hollow and cylindrical on the inside. The gap 5 running around between the first and second braking components 2, 3 is clearly visible. The gap 5 is here at least partially and in particular completely filled with a magnetorheological medium 6.

The first braking component 2 has the core 21, which extends in the axial direction 20 and is made of a magnetically conductive material, and an electric coil 26, which is wound around the core 21 in the axial direction 20 and spans a coil plane 26c. The magnetic field 8 of the electric coil 26 extends transversely to the axial direction 20 through the first braking component 2 or the core 21.

It can be clearly seen that a maximum outer diameter 26a of the electric coil 26 in a radial direction 26d within the coil plane 26c is larger than a minimum outer diameter 21b of the core 21 in a radial direction 25 transverse and for example perpendicular to the coil plane 26c.

The rolling elements 11 are each arranged only in angular segments 61, 62 and cannot rotate completely around the core 21 because the electric coil 26 protrudes into the gap 5 or channel and thus prevents a complete rotation.

Figure 5A:
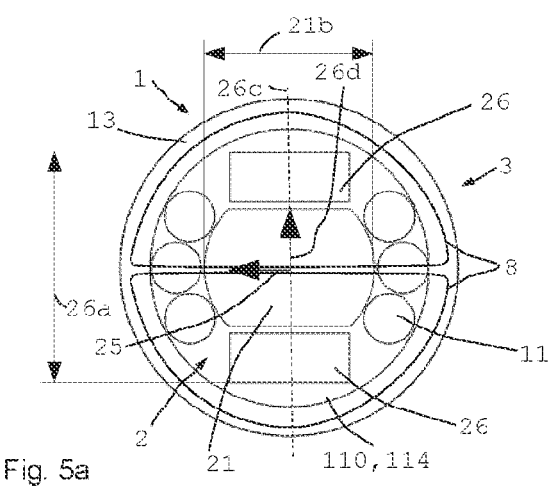
FIGS. 5a-5d show schematic cross-sections of the braking devices according to FIG. 10 or 11.

This means that less space is available for the rolling elements 11. However, this leads to an even higher concentration of the magnetic field 8. FIG. 5a shows three magnetic field lines as examples.

Figure 5B:
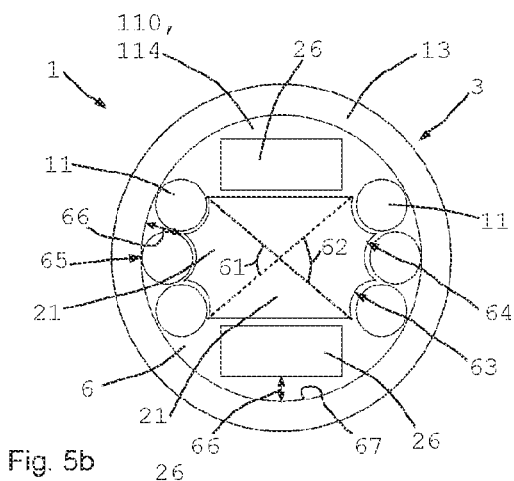

In FIG. 5b, the rolling elements 11 are not accommodated on a cylindrical outer surface of the core 21, but on receptacles 63 specially adapted to the contour of the rolling elements 11, on which receptacles the rolling elements 11 are preferably accommodated and guided with some play. The transition of the magnetic field 8 into the rolling elements 11 is advantageous, since more transmission surface is available between the core 21 or the outer surface 64 on the receptacles 63 and the rolling elements 11.

The electric coil is located outside the angular segments 61 and 62. There are no rolling elements 11 outside the angular segments 61 and 62.

Figure 5C:
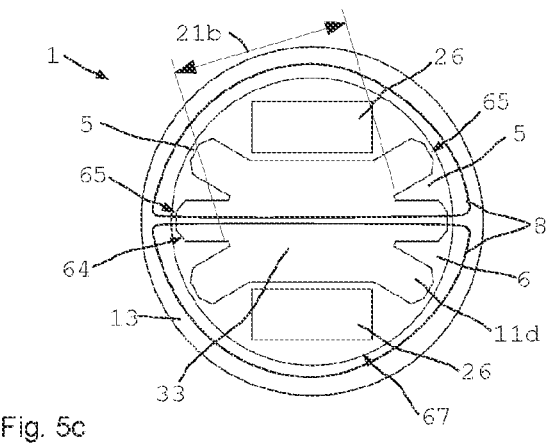
Figure 5D:
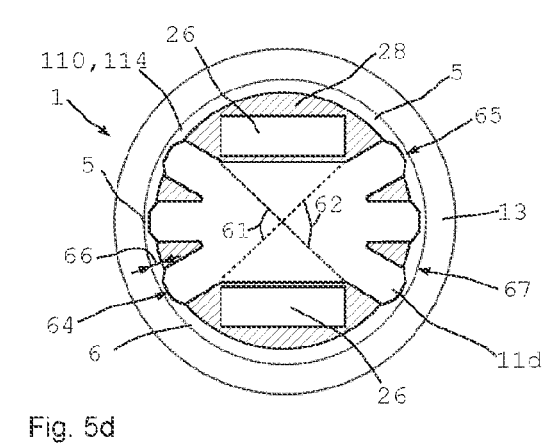

FIGS. 5c and 5d show further developments in which rolling elements 11 are dispensed with completely. The cores 21 have outwardly projecting transmission components 11 that extend radially outwardly from the main body 33 (magnetic field concentrators). In FIG. 5c, the chamber 110 between the core 21 and the rotary part 13 is completely filled with MRF.

The maximum outer diameter 26a of the coil 26 is larger than the minimum core diameter 21b. The radial extent of the gap 5 varies around the circumference. Only a small gap 65 is present at the outer ends of the transmission components 11, while a radial distance 66 between the braking component 2 and the braking component 3 is considerably larger at other locations.

FIG. 5d shows a variant of FIG. 5c, in which the chamber is filled with potting compound 28 over a cylindrical portion to reduce the MRF volume. This reduces the required volume of MRF. The radial distance 66 is significantly reduced, but remains considerably (at least a factor of 2 or 3 or 5 or 10) larger than the radial gap dimension 65. This ensures that the described wedge effect (material accumulation) occurs. The MRF particles chain together and form a kind of wedge, which leads to a significant braking torque. In FIGS. 5c and 5d, the transmission components 11 form some kind of radial arm 11d in each case.

FIGS. 6a to 6d show another embodiment of a computer mouse 300, which here again has a magnetorheological braking device 1 and comprises braking components 2 and 3. A "lying or axial coil" is again used, in which the electric coil 26 is wound around the core 21 in the axial direction 20 and again has a maximum radial coil diameter 26a which is larger than a minimum core diameter 21b of the core 21. Here, too, the rolling elements or transmission elements are not arranged over the full circumference.

The second braking component 3 is received at the first end of the closed chamber 110 at the bearing point 112. Furthermore, the second braking component 3 is received at the second bearing point 118 on the first braking component 2. Here, the bearing arrangement is implemented by means of an axle stub 119 having a diameter 117 at the second bearing point 118. The sealing ring 46 prevents the magnetorheological medium from flowing into the region behind the axle stub 119.

The diameter 117 at the second bearing point 118 is designed to be significantly smaller here than the diameter 116 at the first bearing point 112. Thus, a volume change is made possible here too in the event of an axial displacement. Volume changes caused by temperature and volume changes caused by leakage can be compensated. For this purpose, a relative axial displacement of the first braking component 2 to the second braking component 3 takes place.

In addition, a sensor device 70 for detecting an angular position of the rotor/mouse wheel 303 is also provided here. The magnetic field sensor 72 is integrated in the fixed receptacle 4 or the first braking component 2. At the receptacle 36, the cable 45 of the magnetic field sensor 72, i.e. the sensor line 73, is guided to the outside through the cable bushing 35.

Figure 6A:
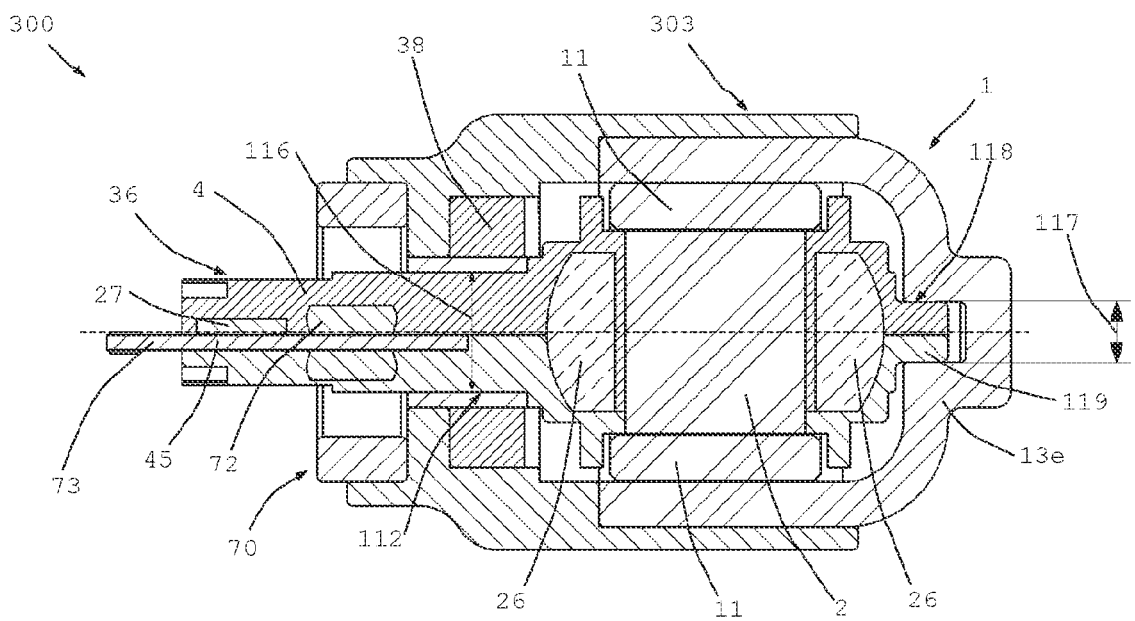
FIGS. 6a-6e show another braking device.
Figure 6B:
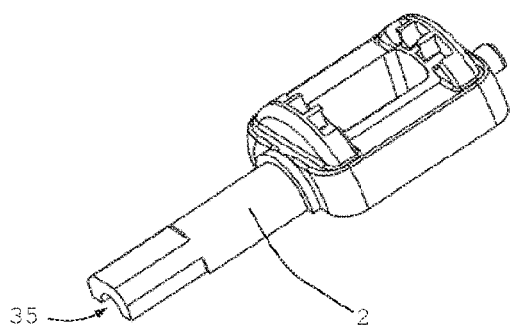
Figure 6C:
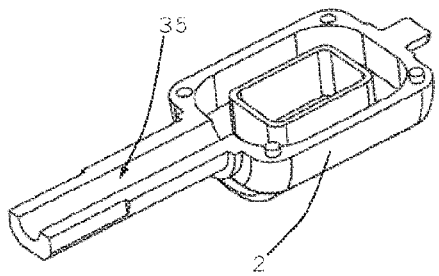

The first axle part or the holder of the braking component 2 can preferably be formed in two parts, as shown in FIGS. 6b and 6c. This simplifies in particular the installation of the electrical lines and in particular the sensor line 73 within the first braking component 2. The cables can be laid through the open cable bushing 35.

Figure 6D:
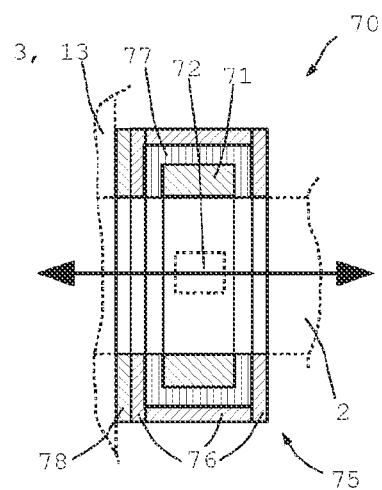

FIG. 6d shows the sensor device 70 again in detail. The first braking component 2 and the second braking component 3, which is formed here as a rotary part, are merely indicated (dashed lines). The sensor device 70 is supported on the rotatable second braking component 3 in a magnetically decoupled manner via the decoupling device 78. The shielding device 75 consists here of three shielding bodies 76, which reduce the scattering of the magnetic field 8 of the electric coil 26. In addition, there is also a separation unit 77 for magnetic separation. The magnetic ring unit 71 is used to measure the orientation or angle of rotation of the magnetorheological braking device 1. The magnetic field sensor 72 is arranged within the first braking component 2. Small relative axial displacements can also be used to detect a pressing down of, for example, a control button 101.

Figure 6E:
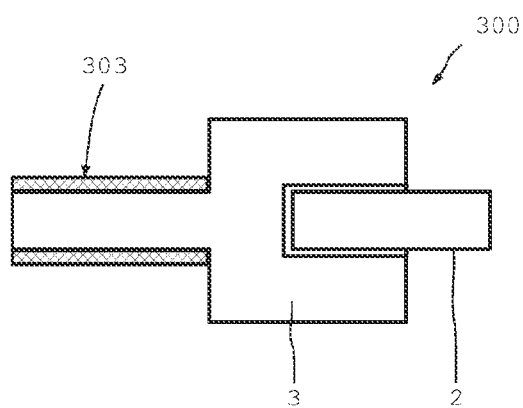

FIG. 6e shows a highly schematic detailed view of a computer mouse 300, in which the inner braking component 2 is fixed and surrounded by the rotatable braking component 3. To this end, the braking component 3 can have a pin portion and a hollow-cylindrical portion. The pin portion can be gripped and rotated and corresponds to the mouse wheel 303, while the hollow-cylindrical portion is where the braking function is realized. Such a design is possible in all embodiments.

Figure 7A:
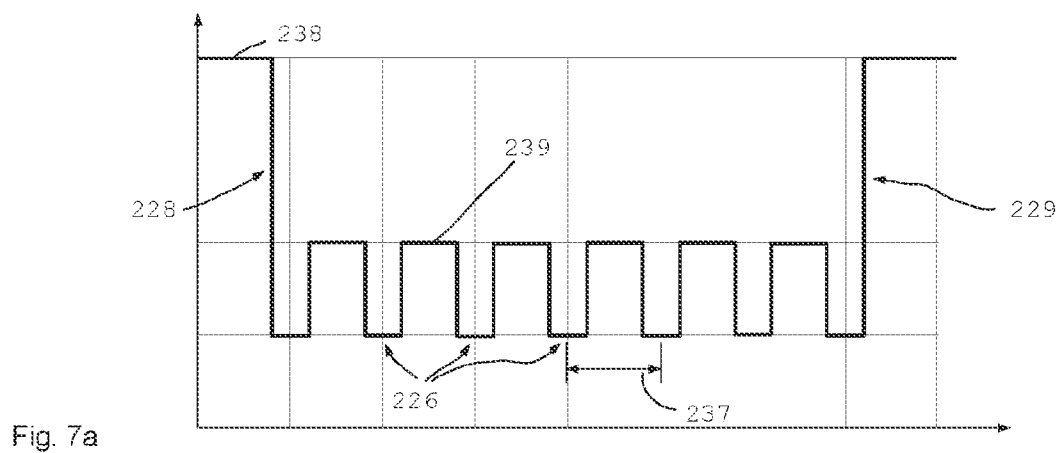
FIGS. 7a-7d show possible torque profiles over the angle of rotation of a braking device.
Figure 7B:
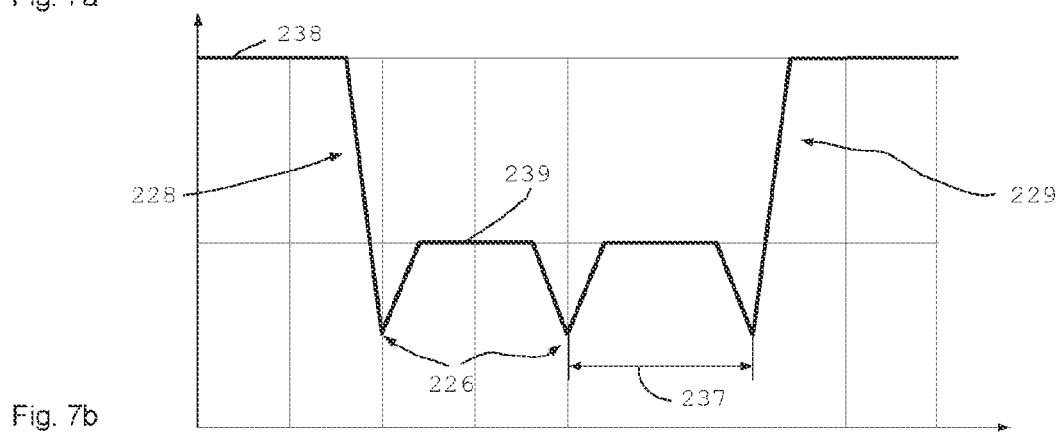
Figure 7C:
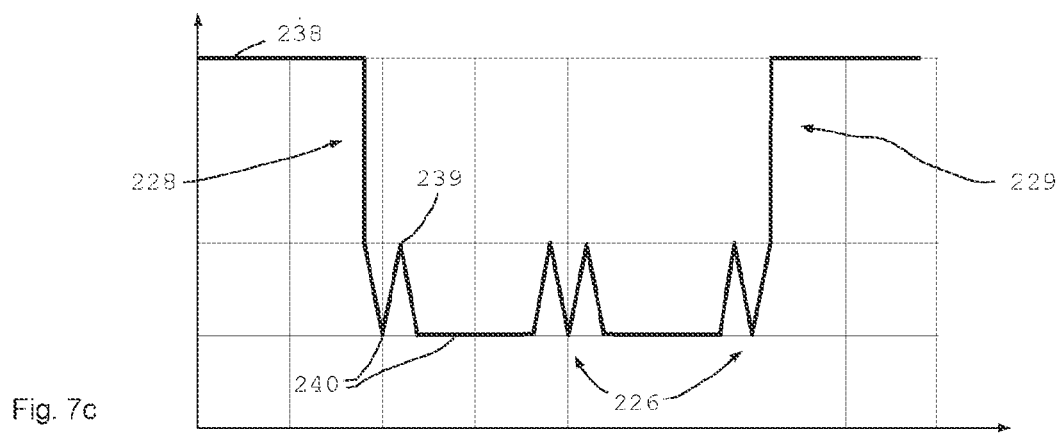

FIGS. 7a, 7b and 7c show possible variants for controlling a dynamically generated magnetic field or a dynamically generated braking torque depending on the angle of rotation.

FIG. 7a shows the resistance to rotation (torque) over the angle of rotation of the mouse wheel 303. With the control device 27, a left end stop 228 and a right end stop 229 (increased torque) can be generated. As the mouse wheel 303 continues to rotate, a high magnetic field or stop torque 238 is generated there, causing the mouse wheel 303 to put up a high resistance to a rotational movement. The user receives the haptic feedback of an end stop.

A detent effect of the rotational movement can be provided or generated here. For example, this can be used to navigate through a graphical menu and select menu items. Here, a first detent point 226 is provided directly next to the left end stop 228 and corresponds to a first menu item in an operation, for example. If the next menu item is to be selected, the mouse wheel 303 must be turned clockwise. For this purpose, the dynamically generated higher magnetic field or detent torque 239 or its friction torque must be overcome before the next detent point 226 is reached. In FIG. 7a, a constant magnetic field is generated for a specific angular range at the detent points 226 and at the intermediate regions, which magnetic field is considerably lower at the detent points than in the intermediate regions and again considerably lower than at the stops 228, 229.

An angular spacing 237 between individual detent points can be dynamically changed and is adapted to the number of available detent points or menu items.

FIG. 7b shows a variant in which the magnetic field does not increase abruptly towards the end stops 228, 229, but follows a steep profile. Furthermore, ramp-like gradients of the magnetic field are provided at the detent points 226 towards both sides of rotation, whereby the rotational resistance increases in the corresponding directions of rotation. Here, only three detent points 226 are provided with the same mouse wheel 303, the angular spacing 237 of which is larger than in the example according to FIG. 7a.

FIG. 7c shows a variant in which there is less rotational resistance between individual detent points 226 and an increased magnetic field 239 is generated only directly adjacent to each detent point 226 to allow engagement at the individual detent points 226 while at the same time providing only low rotational resistance between individual detent points.

In principle, it is also possible to mix the operating modes and the magnetic field profiles of FIGS. 7a, 7b and 7c. For example, with different inputs and, for example, sub-menus a correspondingly different setting of the magnetic field profile can take place.

Figure 7D:
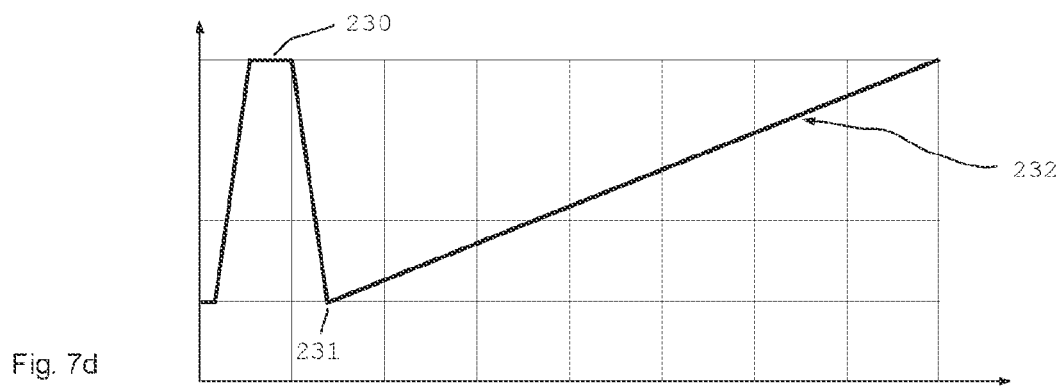

FIG. 7d shows the possible use in adjustment operations with the computer mouse 300 in the form of a profile. The mouse wheel 303 can initially be turned with low resistance for example minimally—or practically not at all. Subsequently, the required torque increases steeply or even abruptly up to the threshold 230. After overcoming the threshold 230, a function is started, for example a media playback, volume or a selection menu. The rotational resistance decreases to a relative minimum torque 231. Immediately thereafter, the function of the mouse wheel 303 is changed here. When turning further, for example a volume is changed or a menu is scrolled through. Here, the required torque is increased linearly according to the slope 232. It is also possible that the profile is not linear. It is also possible that from a specific volume or at the end of the menu a stronger gradient is set or the required torque is abruptly increased a certain amount. This function can also be used, for example, when the user picks up the phone (when making a call from the computer using the mouse wheel, or when the rotary wheel is installed elsewhere, for example in a steering wheel of a car, or in a smartphone). First, the user answers the call by turning the dial above a torque threshold. After that, the torque resumes a lower value and the user can increase the volume by turning it further or can decrease it by counter-rotating it. When hanging up the telephone call, the same happens in the opposite direction.

It is also possible, in all cases, that with, for example, a ripple (detent effect), a switch is not made as before between less and more current with the same polarity (that is to say, for example, +0.2 to +0.8 A=ripple), but alternately with changed polarity, i.e. from +0.2 to +0.8 A, and then the next ripple with −0.2A to −0.8 A, and then the next torque spike from +0.2 to +0.8 A, and so on.

The preferably low-alloy steel can retain a residual magnetic field. The steel is preferably demagnetized regularly or as required (including by a special alternating field).

Preferably, the material FeSi3P (silicon steel) or a related material is used for the components through which the magnetic field flows.

If the mouse wheel 303 is not rotated, i.e. the angle is constant, the current is preferably continuously reduced over time. The current can also be varied depending on the speed (angular speed of rotation of the mouse wheel 303).

Within the system limits, any torque values can be assigned to the rotation angles (torque over rotation angle; Md over alpha).

FIG. 8 shows a further variant for controlling the dynamically generated magnetic field or the dynamically generated braking torque. For this purpose, the current intensity is plotted here over time. Here, the braking device 1 is controlled with a current and/or voltage signal with a frequency 824 of, for example, 100 Hz or higher. Frequencies between 200 Hz to 1000 Hz are also possible and advantageous. The sign of the frequency signal varies. A portion of the positive and negative current flow is distributed asymmetrically 823. As a result, a user receives haptic feedback in the form of a clearly perceptible vibration 825 on the mouse wheel 303. An audible tone 821 can additionally be generated here by the corresponding high-frequency control of the braking device 1 when the mouse wheel 303 is turned. Thus, for example, a warning signal 822 or other indication can be output to the user. Depending on the selection of the frequency 824, the sound can be adapted and also changed in time so that, for example, a violin can be simulated.

FIG. 9 shows a further variant for controlling the dynamically generated magnetic field or the dynamically generated braking torque. For this purpose, the current intensity is plotted here over time. Here, a random current signal 820 is applied to the braking device 1. This provides a user with a particularly distinctive and unusual haptic feedback. For example, the wear of a bearing or even sand in a gearbox can be displayed in this way.

FIG. 10 shows an exemplary smart device 500 according to the invention in the form of a smartphone. Here, the smart device 500 has a body 501 which can be gripped and a wheel 503 which is rotatably mounted on a support structure 502 (not visible here) of the body 501. The wheel 503 is rotated by means of a finger to carry out an input. The wheel 503 here has three actuation zones 504. The movement of the wheel 503 can be damped in a targeted manner by means of a controllable magnetorheological braking device 1 depending on the actuation zone 504 from which the wheel 503 is actuated. The braking device 1 is designed here as previously described for the computer mouse 300.

The current function assignment of the actuation zones 504 is shown here by symbols in the display of the smart device 500. The left-hand actuation zone 504 is currently used to select contacts. The camera function can be activated and operated here with the middle actuation zone 504. The right actuation zone 504 is currently used to operate a calendar function. A specific detent effect is provided for each actuation zone 504.

Figure 11A:
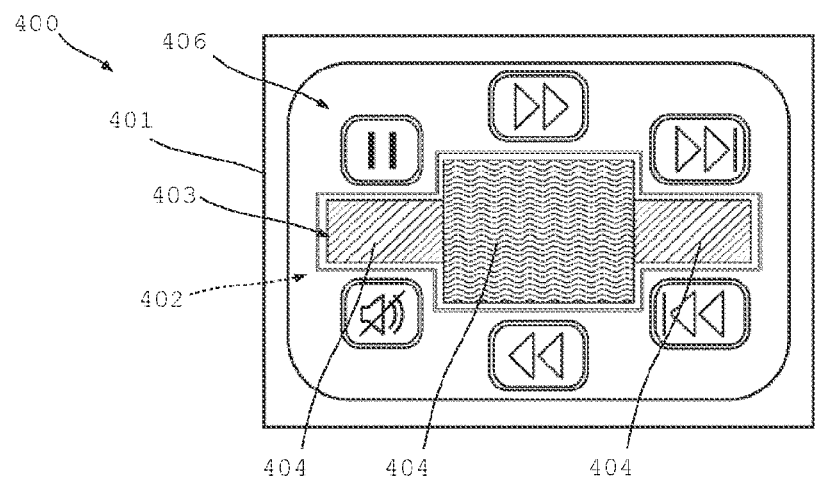
FIGS. 11a-11c show purely schematic representations of a remote control according to the invention in a plan view.
Figure 11B:
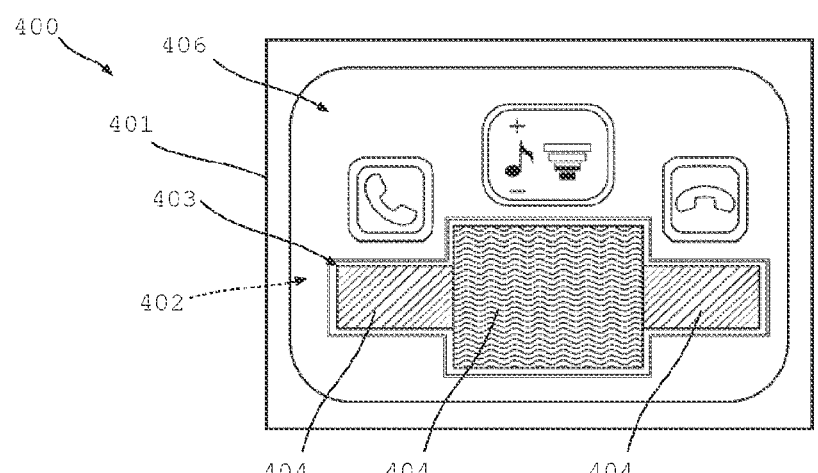
Figure 11C:
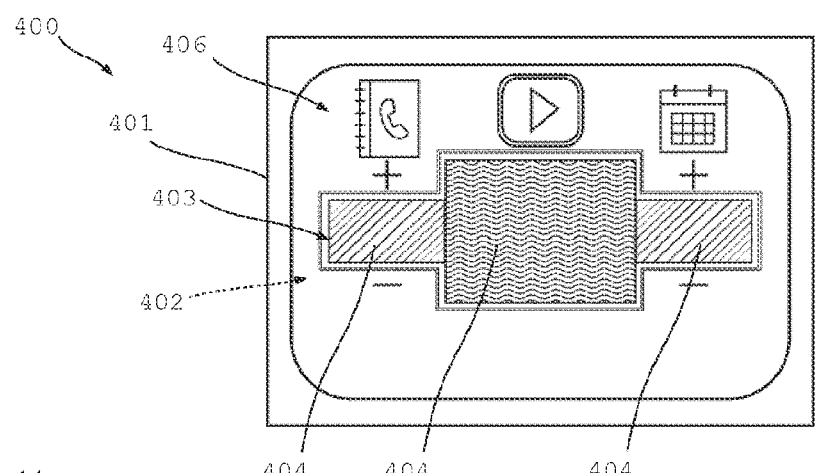

FIGS. 11a to 11c show a remote control 400 according to the invention. A remote control wheel 403 is rotated by means of a finger to carry out inputs into a receiving device that can be coupled to the remote control 400. For this purpose, the remote control wheel 403 is rotatably mounted on a support structure 402 (not visible here) of a body 401 that can be gripped. Here, the remote control wheel 403 comprises three actuation zones 404. The movement of the remote control wheel 403 can be damped in a targeted manner by means of a controllable magnetorheological braking device 1, depending on the actuation zone 404 from which the remote control wheel 403 is actuated. The braking device 1 is formed here as previously described for the computer mouse 300.

The current function assignment of the actuation zones 404 is shown here by symbols in a display of the remote control 400. In FIG. 11a, a function assignment for playing media and for example music or videos is shown here. In FIG. 11b, a function assignment for making telephone calls is shown here. Here, the left actuation zone 404 is used to accept calls. The volume can be adjusted with the middle actuation zone 404. The right actuation zone 404 is used here to end the call. A targeted detent effect is provided here for each actuation zone 404.

Figure 12:
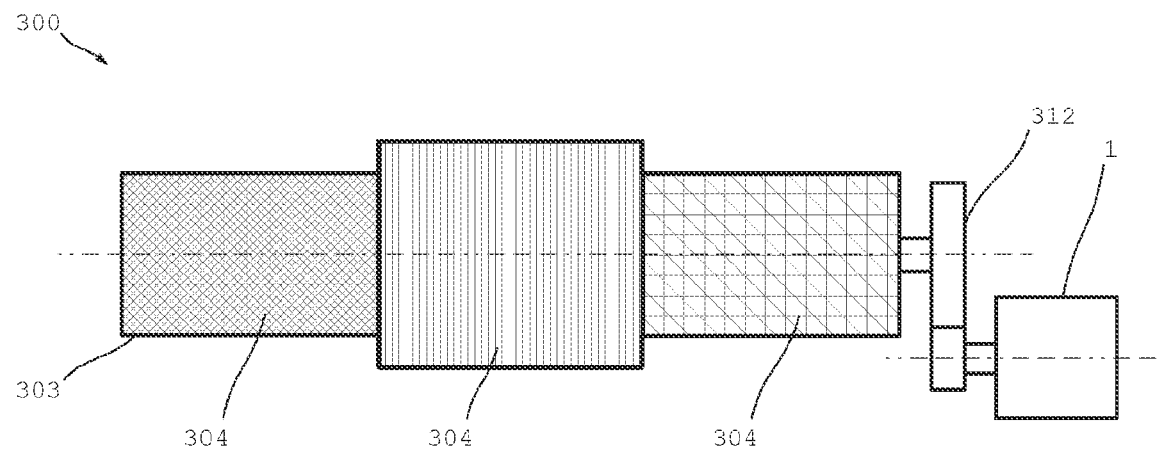
FIG. 12 shows a purely schematic detailed view of the computer mouse with a gear unit.

FIG. 12 shows a detail of a computer mouse 300, as described previously for example. Here, the braking device 1 is coupled to the mouse wheel 303 via a gear unit 919. As a result, a higher (braking) torque can be achieved. In addition, the gear unit 312 bridges the axes of rotation of the mouse wheel 303 and the braking device 1, which are arranged in parallel and offset here (shown by dot-and-dash lines). The gear unit 312 can also be used advantageously for remote control 400.

Figure 13:
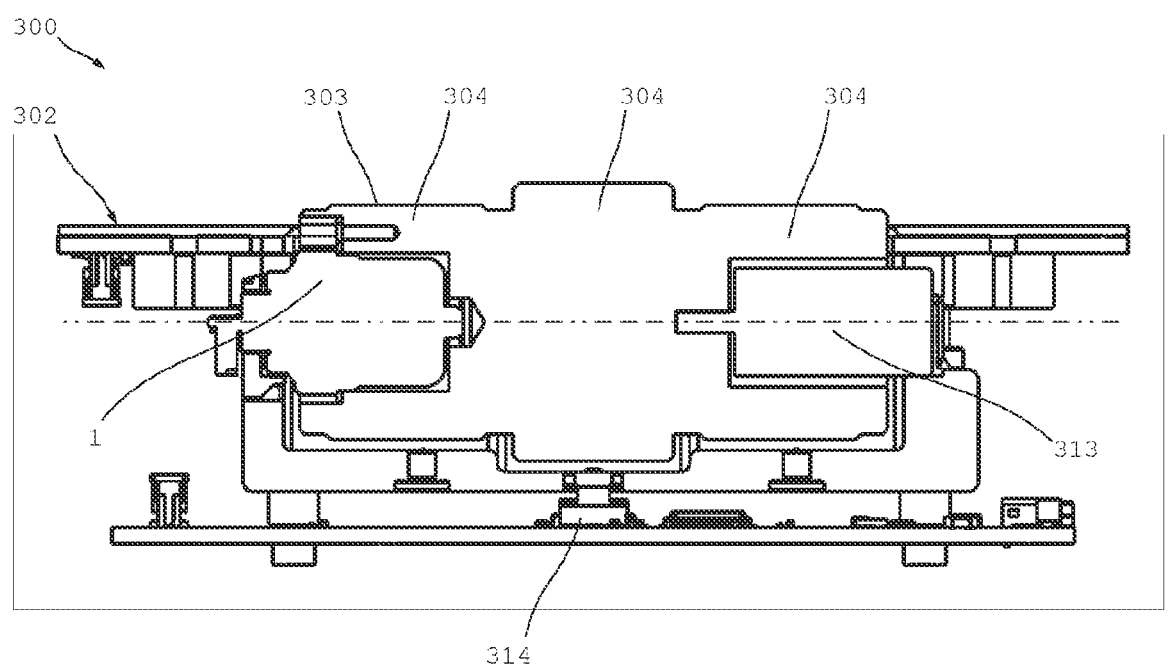
FIG. 13 shows a purely schematic detailed view of a computer mouse with a drive device in a sectional view.

In FIG. 13, a computer mouse 300 is shown in which the mouse wheel 303 can also be actively rotated by a drive device 313 in addition to manual rotation. Such an active drive device can be advantageously used for all computer mice 300 and remote controls 400 described herein. The drive device 313 is arranged here opposite the braking device 1 and has the same axis of rotation (shown by a dot-and-dash line) as the mouse wheel 303 and the braking device 1. This allows for particularly compact housing.

A switching unit 314 is clearly visible here, which can be actuated by pressing the mouse wheel 303. The switching unit 314 is equipped here with a pressure sensor. This allows an input to be made depending on how hard the mouse wheel 303 is pressed. The switching unit 314 can also be designed as a switch without a pressure sensor.

LIST OF REFERENCE SIGNS 1 braking device
2 braking component
3 braking component
4 holder
5 gap, channel
5a gap width
6 medium
8 field
9 free distance
10 acute-angled range
11 transmission component, rolling element, rotary body
11d arm
12 axis of rotation
13 rotary part
13a inner diameter
13b outer diameter
13c height
13d wall thickness
13e sleeve part (1× drawing)
14 ball
15 cylinder
16 wedge shape
17 direction of relative movement
18 direction of relative movement
19 magnetic particles
20 axial direction
21 core
21b minimum diameter
24 outer ring
25 radial direction
26 coil
26a maximum diameter
26c coil plane
26d radial direction to 26c
27 control device
28 potting compound
30 bearing
32 transverse groove
33 main body
35 cable bushing
36 receptacle
36a outer diameter
37 cylindrical running surface
37a outer diameter
38 seal
43 user interface
45 cable
46 sealing ring
48 sliding guide
49 coating
50 console
61 angle segment
62 angle segment
63 receptacle for 11
64 outer surface 65 radial gap dimension
66 radial distance
67 inner surface from 13
68 signal
69 amplitude
70 sensor device
71 magnetic ring unit
72 magnetic field sensor
73 sensor line
74 button
75 shielding device
76 shielding body
77 separation unit
78 decoupling device
110 closed chamber
111 first end of 110
112 first bearing point
113 magnetic field generation device
114 volume of 110
115 second end of the closed chamber
116 diameter first bearing point
117 diameter second bearing point
118 second bearing point
119 axle stub
120 compensation channel
121 end portion of 2
122 radial direction (global)
226 detent point
228 end stop
229 end stop
230 threshold
231 minimum torque
232 gradient
237 angle spacing
238 stop torque
239 detent torque
240 basic torque
300 computer mouse
301 mouse body
302 support structure
303 mouse wheel
304 actuation zone
305 monitoring device
311 arrangement
312 gear unit
313 drive device
314 switching unit
315 gesture recognition zone
321 arrangement
331 contact portion
341 contact portion
351 recess
361 indentation
400 remote control
401 body
402 support structure
403 remote control wheel
404 actuation zone
406 display
500 smart device
501 body
502 support structure
503 wheel
504 actuation zone
506 display
820 current
821 warning sound
822 warning signal
823 asymmetry
824 frequency
825 vibration

The invention claimed is:

1. A computer mouse, comprising:
a mouse body to be manually gripped;
a mouse wheel rotatably mounted to said mouse body and configured to be rotated for carrying out an input to a computer device coupled to the computer mouse;
said mouse wheel having at least two actuation zones,
a controllable magnetorheological braking device configured to control a movement of said mouse wheel and selectively damping the movement in dependence on the actuation zone from which said mouse wheel is being actuated or in dependence on which actuation zone had been previously activated.

2. The computer mouse according to claim 1, wherein said braking device comprises at least one field generation device for generating a controlled magnetic field and a magnetorheological medium, and said at least one field generation device is configured to influence the medium in order to adjust a torque for a rotatability of said mouse wheel.

3. The computer mouse according to claim 1, wherein said actuation zones are connected to one another for conjoint rotation and/or said actuation zones have a common axis of rotation.

4. The computer mouse according to claim 1, further comprising a sensor for sensing an angle of rotation of said mouse wheel, and wherein a damping is selectively adjustable depending on the angle of rotation of said mouse wheel detected by said sensor.

5. The computer mouse according to claim 1, which comprises a monitoring device configured to detect, by way of sensors, from which of the actuation zones the actuation is taking place.

6. The computer mouse according to claim 1, wherein the respective actuation zones are activated by depressing said mouse wheel.

7. The computer mouse according to claim 1, wherein the actuation zones are haptically distinguishable and are formed with at least one feature selected from the group consisting of different surface, different surface structure, different size, different geometry, different color, and different material.

8. The computer mouse according to claim 1, further comprising a control device configured for controlling said braking device in dependence on a control command and for converting the control command into a haptic signal to be perceived at the mouse wheel, the haptic signal being a defined sequence of deceleration torques providing a user with haptic feedback at said mouse wheel as a consequence of an input made and/or during an input.

9. The computer mouse according to claim 8, wherein the haptic feedback is provided depending on the actuation zone in which said mouse wheel is actuated and touched.

10. The computer mouse according to claim 1, wherein a particular input is made depending on the actuated actuation zone, and wherein an assignment of actuation zone and input is programmable and/or dynamically adaptable.

11. The computer mouse according to claim 1, wherein said mouse wheel is configured with a rotational movement subject to an adjustable detent effect during scrolling, and wherein the detent effect is generated by a targeted deceleration or blocking and a targeted release of the rotational movement at specific time intervals and/or at specific angles of rotation, and wherein the detent effect is also set depending on the actuation zone from which said mouse wheel is actuated.

12. The computer mouse according to claim 1, wherein said mouse wheel is arranged on said mouse body with optimization for a right-handed user or said mouse wheel is arranged on said mouse body with optimization for a left-handed user.

13. The computer mouse according to claim 1, wherein said mouse body is formed with at least a first contact portion for an index finger and at least a second contact portion for a thumb, and wherein at least one mouse wheel is arranged in the first contact portion and wherein at least one mouse wheel is arranged in the second contact portion.

14. The computer mouse according to claim 1, wherein a rotatability of said mouse wheel is adjustable by said braking device between freely rotatable and completely blocked for a manually generated force occurring at the mouse wheel during operation.

15. The computer mouse according to claim 1, wherein said mouse wheel is configured to be pressed and/or axially displaced to carry out a specific input.

16. The computer mouse according to claim 1, wherein said mouse wheel is a rocker having a rocker bearing between the at least two actuation zones, enabling the mouse wheel to be pressed to both sides of said rocker bearing to carry out an input, and wherein a specific input is made depending on the actuation zone being pressed.

17. A method for operating a computer mouse, the method comprising:
providing a computer mouse that is configured for carrying out inputs into a computer device to be coupled to the computer mouse;
selectively rotating a mouse wheel that is rotatably mounted to the mouse body, that has at least two actuation zones, and that is configured for carrying out an input to the computer device coupled to the computer mouse;
controlling a movement of the mouse wheel with a controllable magnetorheological braking device and selectively damping the movement in dependence on the actuation zone from which the mouse wheel is actuated or in dependence on which actuation zone had been previously activated.

18. The method according to claim 17, which comprises indicating by an optical signal the actuation zone that is currently intended for carrying out an input, and automatically adapting a movement resistance for a movability of the mouse wheel to the currently intended execution of the input.

19. A remote control for carrying out inputs into a receiving device to be coupled to the remote control, the remote control comprising:
a remote control body to be at least partially gripped;
at least one remote control wheel rotatably mounted on a support structure of said remote control body for rotation by at least one finger to carry out an input;
said remote control wheel having at least two actuation zones;
a controllable braking device configured to damp a movement of said remote control wheel in a targeted manner depending on the respective actuation zone from which said remote control wheel is being actuated and/or depending on which of the actuation zones had been previously activated.

20. A smart device, comprising:
a device body to be at least partially gripped and at least one wheel rotatably mounted on a support structure of said device body;
said wheel having at least two actuation zones and being rotatable by a finger of a user to carry out an input;
a controllable braking device configured for damping a movement of said wheel in a targeted manner depending on the respective actuation zone from which said wheel is being actuated and/or depending on which of the actuation zones had been previously activated.

* * * * *